United States Patent [19]
Mochizuki et al.

[11] Patent Number: 5,856,997
[45] Date of Patent: Jan. 5, 1999

[54] SPREAD SPECTRUM RECEIVING APPARATUS

[75] Inventors: Norihiro Mochizuki; Katsuo Saito, both of Yokohama; Akira Torisawa, Tokyo; Toshihiko Myojo, Yokohama; Ichiro Kato, Kawasaki; Tetsuo Kanda, Yokohama; Atsushi Takasaki; Kazuo Moritomo, both of Tokyo; Rie Suzuki, Yokohama, all of Japan

[73] Assignee: Canon Kabushiki Kaisha, Tokyo, Japan

[21] Appl. No.: 546,040

[22] Filed: Oct. 20, 1995

[30] Foreign Application Priority Data

| Oct. 21, 1994 | [JP] | Japan | 6-256713 |
| Oct. 21, 1994 | [JP] | Japan | 6-256714 |
| Oct. 21, 1994 | [JP] | Japan | 6-256715 |
| Aug. 29, 1995 | [JP] | Japan | 7-220515 |

[51] Int. Cl.$^6$ ................................................. H04B 1/69
[52] U.S. Cl. .............................................. 345/200; 375/208
[58] Field of Search ....................................... 375/200, 208, 375/206, 316

[56] References Cited

U.S. PATENT DOCUMENTS

| 5,195,105 | 3/1993 | Hasimoto et al. | 375/208 |
| 5,596,599 | 1/1997 | Saito | 375/208 |

FOREIGN PATENT DOCUMENTS 0622920  11/1994  European Pat. Off. ......... H04J 13/00

*Primary Examiner*—Temesghen Ghebretinsae
*Attorney, Agent, or Firm*—Fitzpatrick, Cella, Harper & Scinto

[57] ABSTRACT

A receiving apparatus includes a base-band conversion circuit, a synchronizing circuit/code generator and a demodulator. The base-band conversion circuit converts a received signal into a base-band signal. The synchronizing circuit/code generator detects a spread code included in the received signal to generate a plurality of spread codes in synchronization with the spread code included in the received signal. The demodulator uses the plurality of spread codes supplied by the synchronizing circuit/code generator to demodulate the base-band signal.

24 Claims, 34 Drawing Sheets

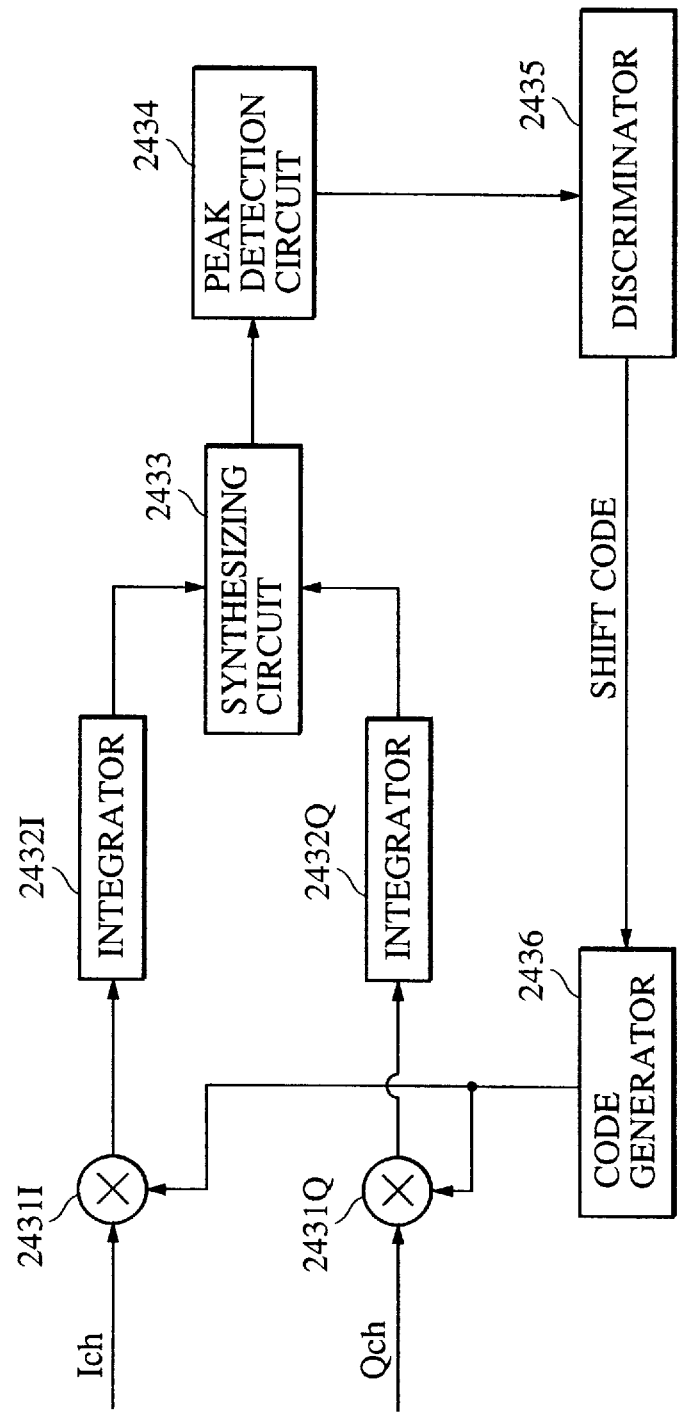

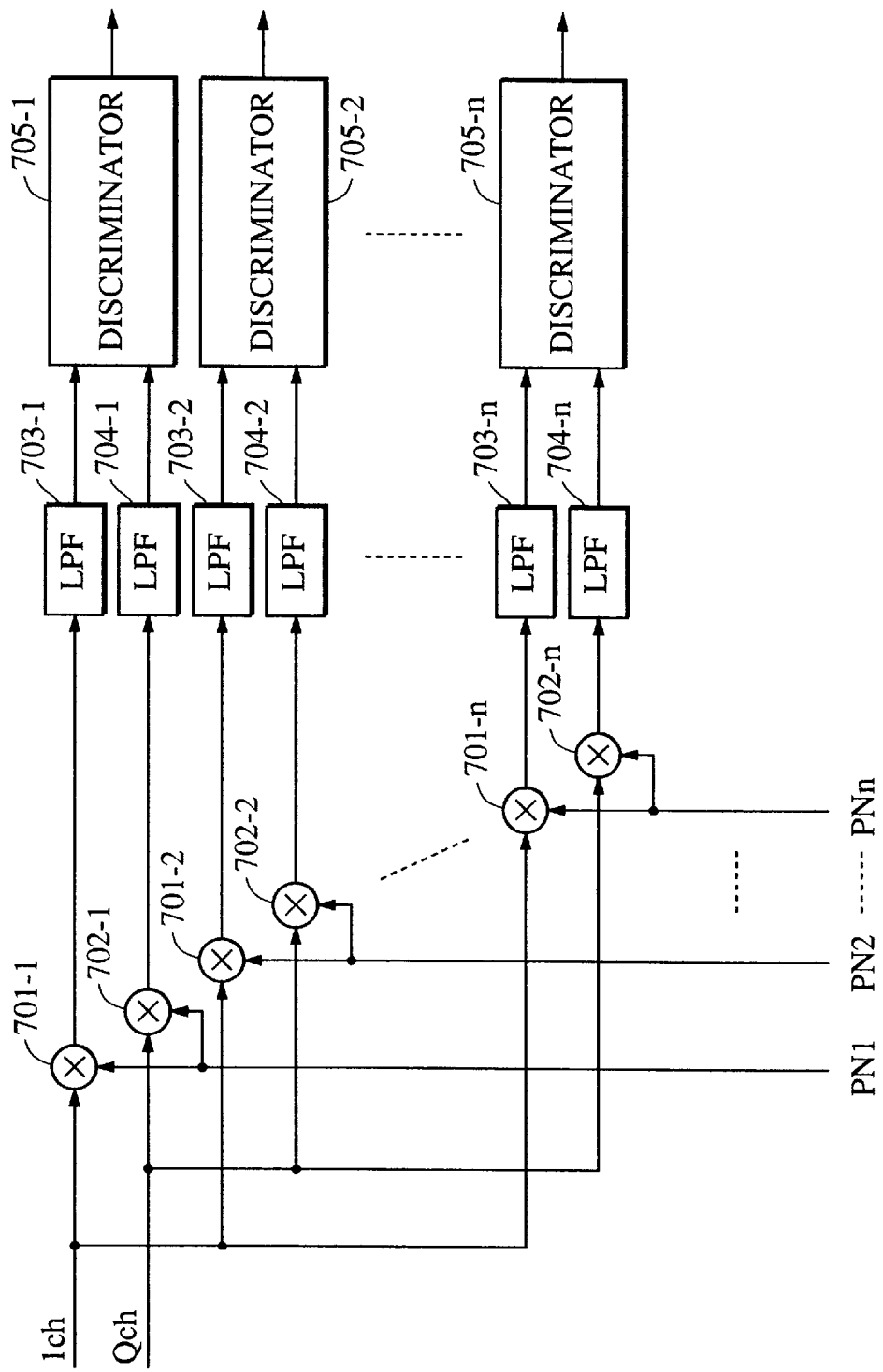

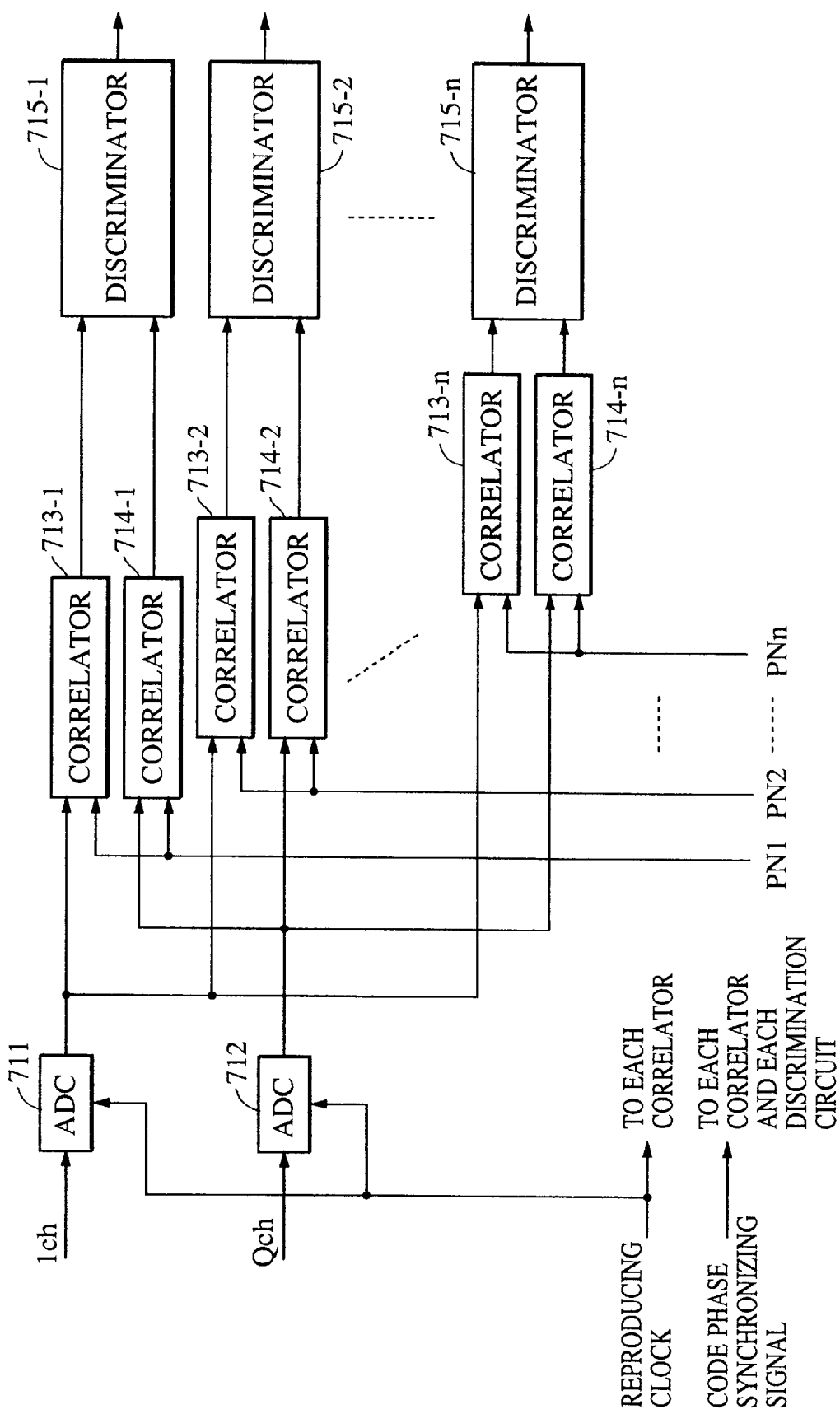

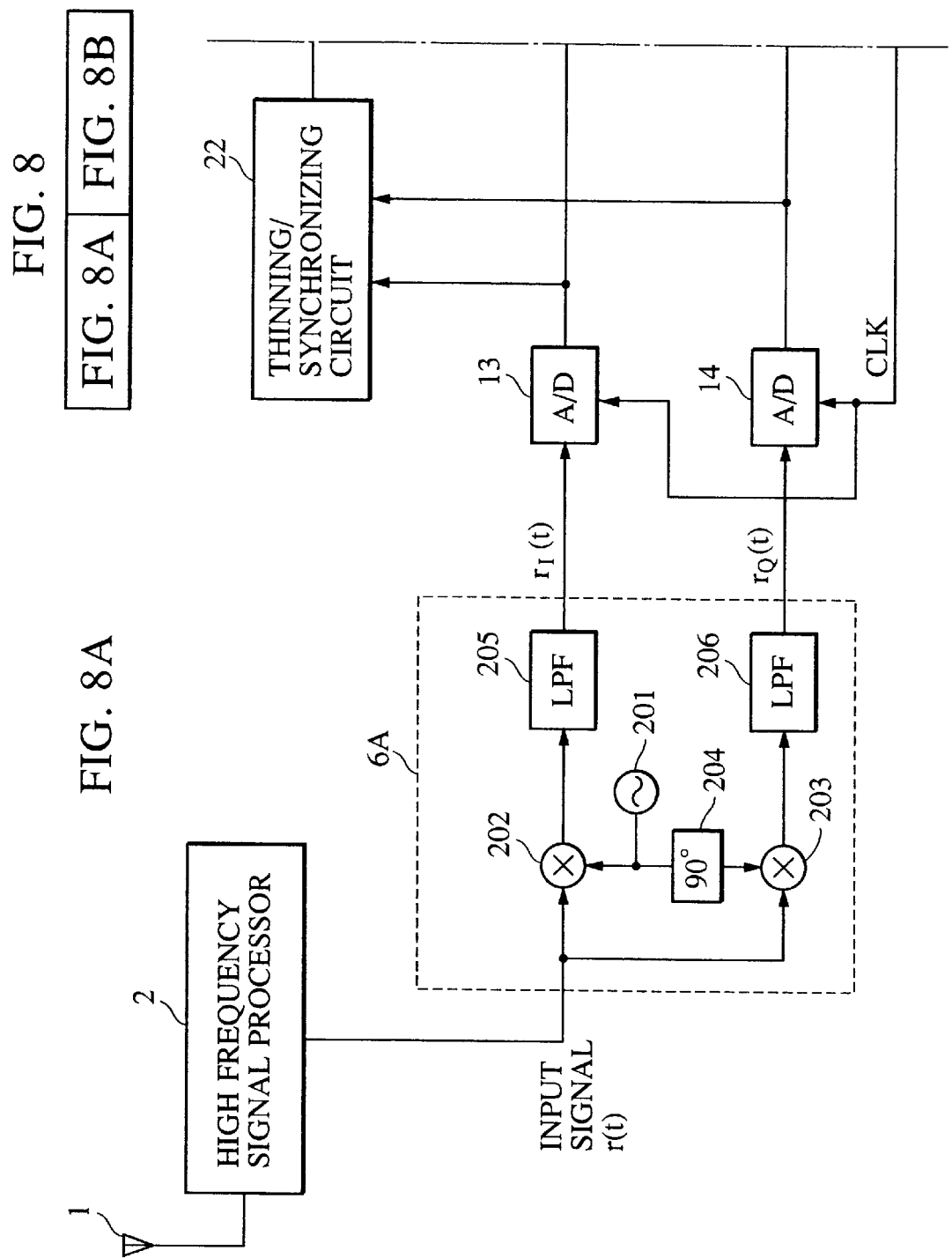

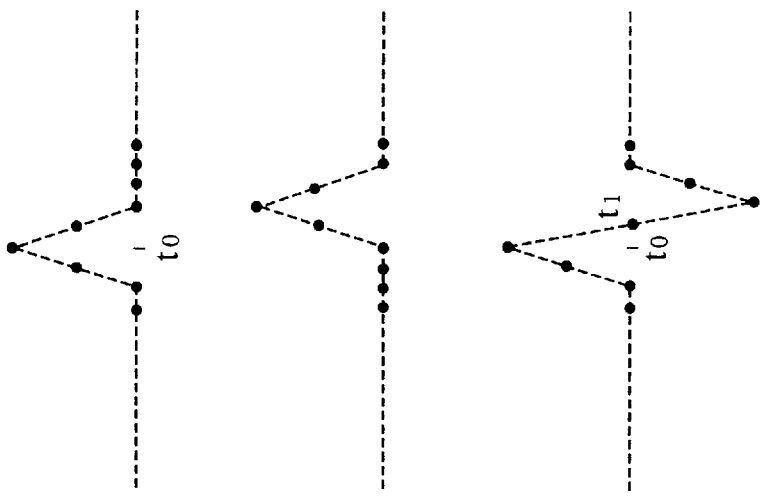
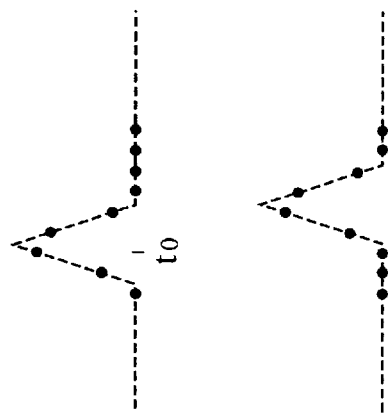
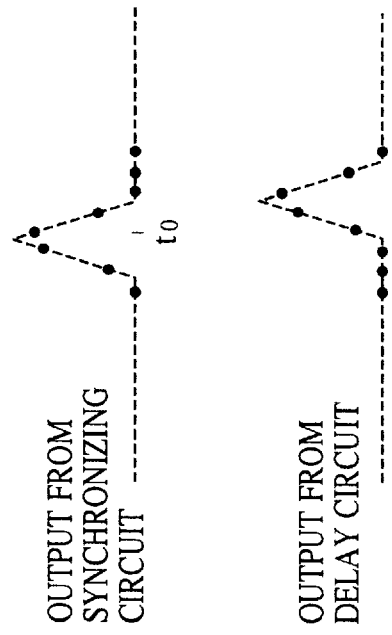

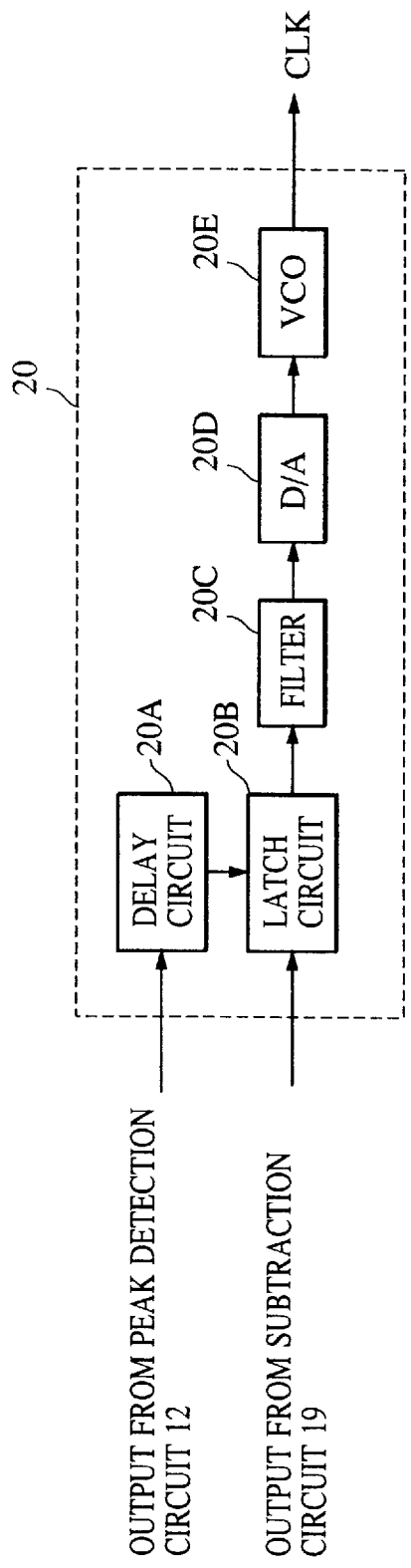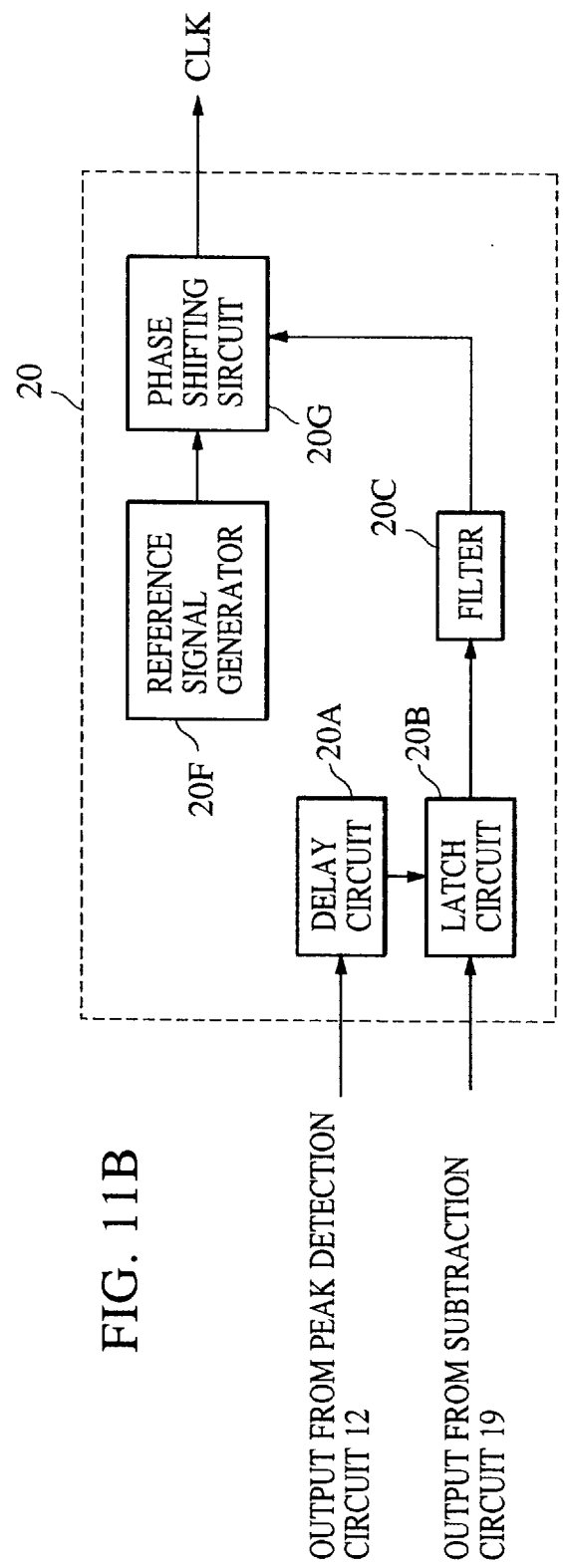
FIG. 11A
FIG. 11B

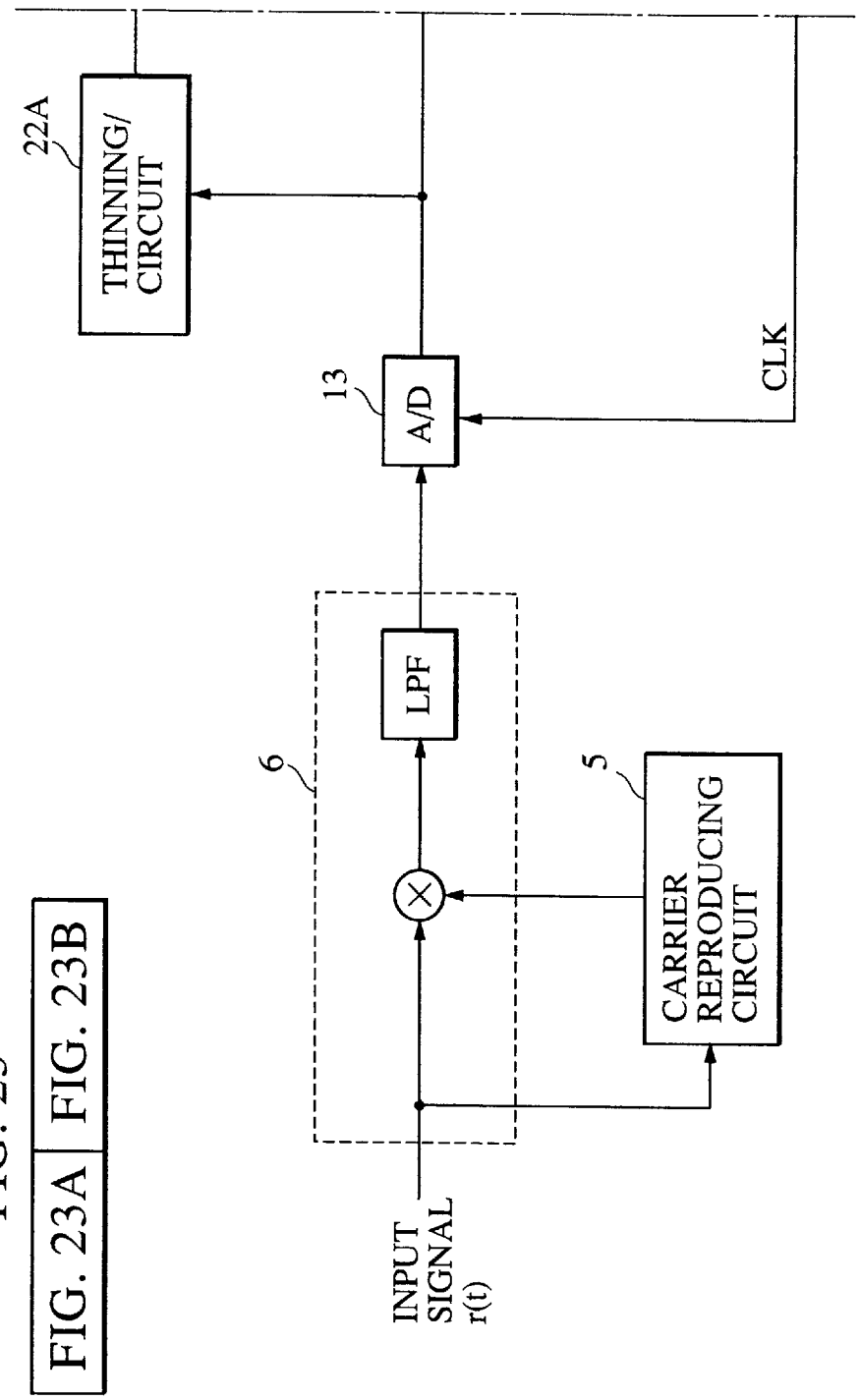

SPREAD SPECTRUM RECEIVING APPARATUS

BACKGROUND OF THE INVENTION

1. Field of the Invention

The present invention relates to a receiving apparatus for receiving a spread spectrum signal, specifically a multi-code spread spectrum signal.

2. Related Background Art

A spread spectrum communication system employing a direct sequence spread method is a method of generating, from a base-band signal of a digital signal to be transmitted, a base-band signal having a significantly wide band width with respect to original data. This is accomplished by using a spread code sequence, such as a pseudo noise code (a PN code). Furthermore, modulation, such as PSK (Phase Shift Keying) or FSK (Frequency Shift Keying), is performed to convert the base-band signal into an RF (Radio Frequency) signal so as to transmit the RF signal. A receiver unit uses the same spread code as that used in a transmitter unit to perform a despread operation to perform correlation with the received signal so as to convert the received signal into a narrow-band signal having a band width that corresponds to the original data. Then, a normal data demodulation is performed so that the original data is reproduced.

Since the spread spectrum communication system employs a significantly wide transmission band width with respect to the information band width as described above, the foregoing system cannot realize an unsatisfactorily low transmission speed as compared with a typical narrow band width modulation system if the transmission band width is within a certain condition. To overcome the foregoing problem, a multi-code method has been employed. The foregoing method includes the steps of converting a high-speed information signal into low-speed parallel data, spread-modulating the parallel data in different spread code sequences so as to add data, and converting the data into an RF signal that is then transmitted, so that high speed data transmission is realized under a predetermined condition of the transmission band width without deterioration in the spread rate in the spread modulation.

FIG. 31 shows the structure of a transmission mechanism adapted to the foregoing method. Supplied data is converted into n parallel data items by a serial-parallel converter 301. Each converted data is, by a multiplier group consisting of n multipliers 302-1 to 302-n, multiplied by n different spread code outputs from a spread-code generator 303 so as to be converted into wide band spread signals over n channels. Then, the outputs from the respective multipliers are added by an adder 304 so as to be provided to a high-frequency transmitter stage 305. The added wide spread base-band signals are, by the high-frequency transmitter stage 305, converted into a transmission frequency signal having an appropriate central frequency so as to be transmitted by a transmission antenna 306.

FIG. 32 shows the structure of a receiver. The signal received by an antenna 401 is appropriately filtered and amplified by a high-frequency signal processor 402 so as to be converted into a signal having an intermediate frequency. The intermediate-frequency signal is distributed to n channels connected in parallel to correspond to the spread codes. In each channel, the correlation of the input signal with outputs from spread code generator group 404-1 to 404-n is detected in correlator group 403-1 to 403-n so as to be despread, the spread code generator group 404-1 to 404-n corresponding to the channels of the correlator group 403-1 to 403-n. Synchronization of the despread signal is established at each channel in synchronizing circuit group 405-1 to 405-n so that the code phases and clocks of the spread code generators are made to coincide with one another. The despread signals are also demodulated in demodulator group 406-1 to 406-n so that data is reproduced. Then, reproduced data is converted into serial data in serializer 407 so that the original information is reproduced.

However, since the correlator at each demodulation channel acts as the intermediate frequency stage, the conventional structure suffers from a problem in that the size of the circuit cannot be reduced.

SUMMARY OF THE INVENTION

An object of the present invention is to reduce the size of a structure required for receiving a multi-code spread spectrum signal.

Another object of the present invention is to accurately receive a multi-code spread spectrum signal.

Another object of the present invention is to accurately synchronize a multi-code spread spectrum signal.

Another object of the present invention is to realize high-speed communication.

Another object of the present invention is to provide a spread spectrum signal receiving apparatus for, and a method of converting, a received signal into a base-band signal, detecting a spread code from the base-band signal, and demodulating the base-band signal on the basis of a plurality of spread codes in synchronization with the detection of the spread code.

Other and further objects, features and advantages of the invention will be evident from the following detailed description of the preferred embodiments taken in conjunction with the attached drawings.

BRIEF DESCRIPTION OF THE DRAWINGS

FIGS. 3A and 3B are circuit diagrams of synchronizing circuits comprising a sliding correlator and a delay locked loop circuit;

FIG. 4 is a circuit diagram of the demodulator 7A of FIG. 1, formed by an analog circuit;

FIG. 5 is another circuit diagram of the demodulator 7A of FIG. 1 formed by a digital circuit;

FIGS. 8A and 8B, when taken together as shown in FIG. 8 show the structure of a second embodiment of the present invention in which synchronization with a quasi-base-band signal is established;

FIGS. 10A–10C are waveform graphs showing the outputs from the synthesizing circuit 17, the delay circuit 18 and the subtraction circuit 19 shown in FIG. 8B;

FIGS. 11A and 11B are circuit diagrams of circuits which may be used as the clock control circuit 20 of FIG. 8B;

FIGS. 23A and 23B when taken together as shown in FIG. 23 are diagrams showing the structure of a sixth embodiment of the present invention in which synchronization with a base-band signal is established;

DESCRIPTION OF THE PREFERRED EMBODIMENTS

Figure 1:
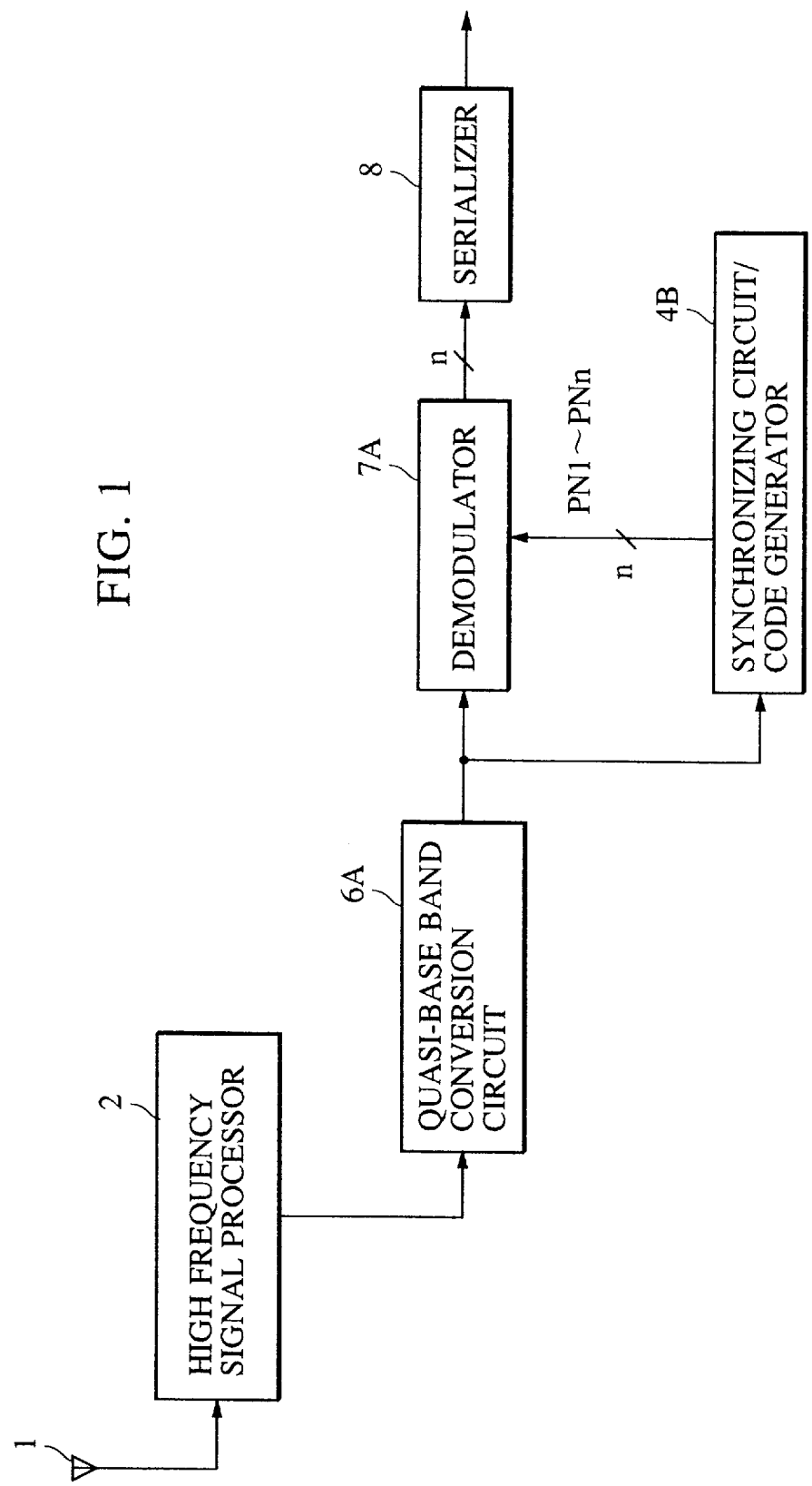
FIG. 1 is a diagram showing the structure of a first embodiment of the present invention in which synchronization with a quasi-base-band signal is established.

FIG. 1 is a diagram showing the structure of a first embodiment of the present invention. Referring to FIG. 1, reference numeral 1 represents an antenna, 2 represents a high-frequency signal processor for processing, at a high frequency stage thereof, the signal received by the antenna 1, 4B represents a synchronizing circuit for capturing and maintaining synchronization with the code and clock for the transmission unit; and a code generator for generating n spread codes for demodulating data and spread codes for synchronization from a code synchronizing signal and a clock signal, 6A represents a quasi-base-band conversion circuit for converting the received signal into a quasi-base-band signal, 7A represents a demodulator that uses the quasi-base-band signal transmitted from the quasi-base-band conversion circuit 6A and n spread codes transmitted from the code generator 4B to demodulate data, and 8 represents a parallel/serial conversion circuit for converting n parallel data items into serial data.

Referring to FIG. 1, the signal received by the antenna 1 is supplied to the high-frequency signal processor 2. The high-frequency signal processor 2 comprises, for example, an amplifier, a filter and a frequency conversion circuit. Thus, the received signal is, in the high-frequency signal processor 2, appropriately amplified and filtered so that the high frequency component of the received signal is maintained as it is, or the same is converted into an intermediate frequency. The output from the high-frequency signal processor 2 is converted into a quasi-base-band signal by the quasi-base-band conversion circuit 6A.

Figure 2:
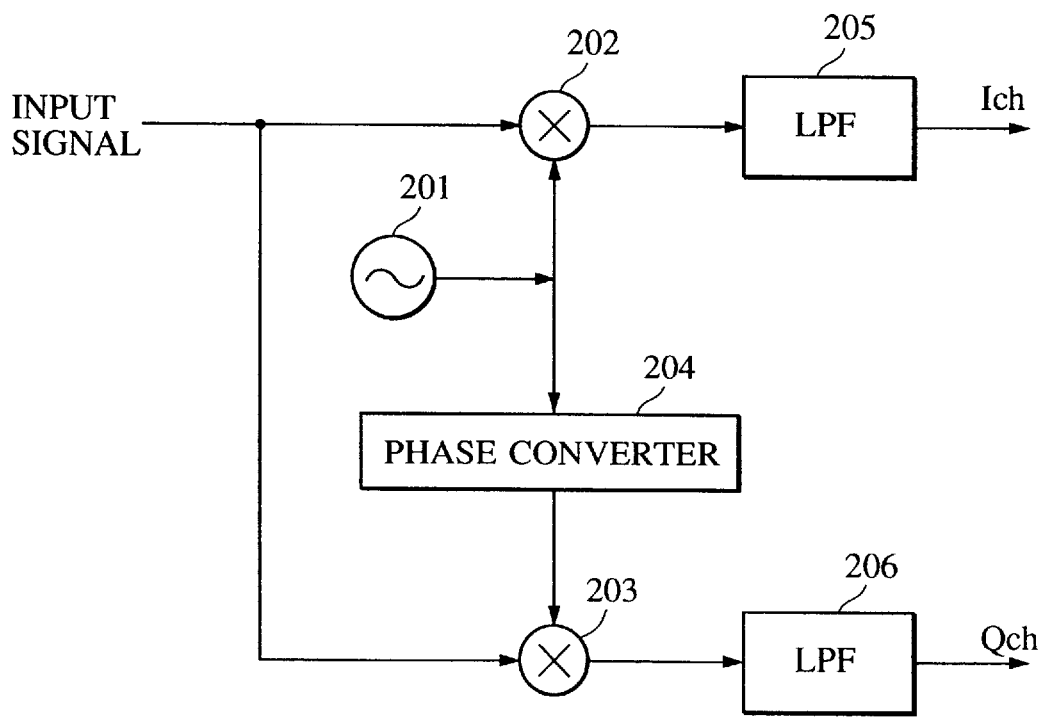
FIG. 2 is a circuit diagram of the quasi-base-band conversion circuit 6A of FIG. 1.

FIG. 2 shows an example of the quasi-base-band conversion circuit 6A. The signal supplied from the high-frequency signal processor 2 is branched into two sections that are then received by multipliers 202 and 203. The multiplier 202 is also supplied with the output from a local oscillator 201 which generates a signal having a frequency that is substantially the same as the central frequency of the signal transmitted from the high-frequency signal processor 2, so that the in-phase component (Ich) is extracted by a low-pass filter 205. The multiplier 203 is also supplied with the output from the local oscillator 201, the phase of the output being converted by an angular degree of 90° by a phase converter 204 before the output is supplied to the multiplier 203 so that the orthogonal component (Qch) is extracted by a low-pass filter 206.

The quasi-base-band signal transmitted from the quasi-base-band conversion circuit 6A is supplied to the synchronizing circuit/code generator 4B and the demodulator 7A. The synchronizing circuit/code generator 4B uses a spread code PNr for synchronization to establish the synchronization of the code and clock with respect to those of the transmitted signal so as to transmit a code synchronizing signal and a clock signal. As the spread code PNr for synchronization, it is preferable that a code corresponding to one of a plurality of multiplex codes $PN_1$ to PNn is used. A code for only synchronization may be employed. The synchronizing circuit/code generator 4B can be formed by using a sliding correlator and a delay locked loop circuit, as shown in FIGS. 3A and 3B.

Referring to FIG. 3A, multipliers 2431I and 2431Q multiply a synchronizing spread code PNr supplied from a code generator 2436 and data in the channels Ich and Qch. The code generator 2346 generates a spread code PNr in accordance with the clock having substantially the same frequency as that of the transmission-side spread code. Integrators 2432I and 2432Q integrate the outputs from multipliers 2436I and 2436Q for one period of the spread code PNr. A synthesizing circuit 2433 synthesizes the outputs from the integrators 2432I and 2432Q. The synthesizing circuit 2433 squares the outputs from the integrators 2432I and 2432Q to add the foregoing outputs or obtain the square root of the result of the addition. As an alternative to this, the absolute values of the outputs from the integrators 2432I and 2432Q may be added, or either of the outputs from the integrators 2432I or 2432Q may be selected. A peak detection circuit 2434 detects the peak of the output from the synthesizing circuit 2433. A discriminator 2435 instructs the code generator 2436 to shift the code if no peak has been detected by the peak detection circuit 2434.

Figure 3B:
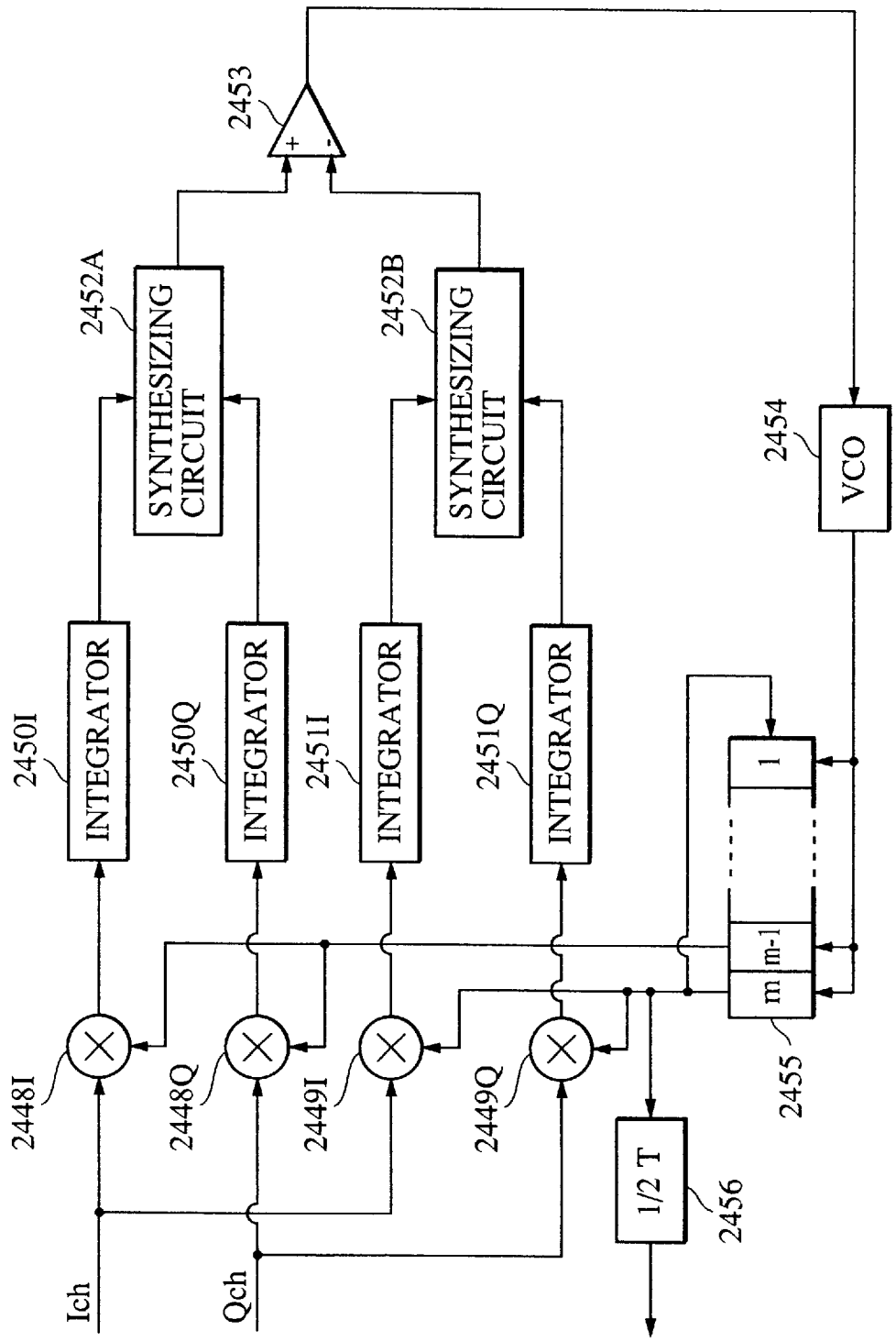

Referring to FIG. 3B, reference numeral 2455 represents a shift register type code generator. When a clock is supplied from a VCO 2454, data in a leading bit (the m-th bit) is transmitted to a delay circuit 2456 and multipliers 2449I and 2449Q, and is also transferred to a final bit (the first bit) of the shift register. Data in the m-1 th bit of the shift register is transmitted to multipliers 2448I and 2448Q, and is also shifted to the m-th bit of the shift register. Data in the m-2 th bit, that in the m-3 th bit, ... , data in the first bit of the shift register are respectively shifted to the left by one.

The multipliers 2448I and 2448Q multiply data in the m-1 th bit and data in the channels Ich and Qch, while the multipliers 2449I and 2449Q multiply data in the m-th bit and data in the channels Ich and Qch. Integrators 2450I, 2450Q, 2451I and 2451Q integrate the outputs from the multipliers 2448I, 2448Q, 2449I and 2449Q for one period of the spread code PNr. A synthesizing circuit 2452A synthesizes the outputs from the integrators 2450I and 2450Q, while the synthesizing circuit 2452A synthesizes the outputs from the integrators 2451I and 2451Q. A subtractor/amplifier 2453 transmits a signal that corresponds to the difference between the output from the synthesizing circuit 2452A and that from the synthesizing circuit 2452B. A voltage control oscillator (VCO) 2454 oscillates at a frequency that corresponds to the output from the subtractor/amplifier 2453. The delay circuit 2456 delays the output of the n-th bit from the code generator 2455 by a half clock for transmission.

The code generator 4B transmits, to the demodulator 7A, n spread codes $PN_1$ to $PN_n$ for demodulation in synchronization with the output from the delay circuit 2456.

Quasi-base-band signals in the channels Ich and Qch transmitted from the quasi-base-band conversion circuit 6A are, together with the n spread codes PN1, ... , PNn for demodulating data transmitted from the code generator 4B, supplied to the demodulator 7A so as to be correlated with each spread code for demodulating data so that n data items are demodulated.

FIG. 4 shows a first example of the demodulator 7A. Signals in the channels Ich and Qch are respectively branched into n pieces so as to be supplied to multipliers 701-1 to 701-n and multipliers 702-1 to 702-n. The multipliers 701-1 to 701-n and multipliers 702-1 to 702-n are respectively supplied with the spread codes PN1, ... , PNn so that the signals in the respective channels and the spread codes are multiplied. The outputs from the multipliers 701-1 to 701-n are respectively filtered by low-pass filters 703-1 to 703-n so that the correlation is detected by the respective spread codes so as to be despread. Similarly, the outputs from the multipliers 702-1 to 702-n are respectively filtered by low-pass filters 704-1 to 704-n so that the correlation is detected by the respective spread codes so as to be despread.

Both signals in the channels Ich and Qch, which are despread by the same spread code are supplied to discriminators 705-1 to 705-n so that data is discriminated and, thus, parallel demodulated data is obtained. As the discriminators, delay wave-detectors or the like may be employed that perform the discrimination by performing a comparison of the phase of a given signal with the phase of the immediately prior signal.

N parallel outputs from the demodulator 7A are, by the parallel/serial conversion circuit 8, converted into serial data for transmission.

FIG. 5 shows a second example of the demodulator 7A. The embodiment shown in FIG. 5 has a structure such that a reproducing clock and a code phase synchronizing signal are supplied to the demodulator 7A from the synchronizing circuit/code generator 4B. The reproducing clock is in a form delayed by a half clock from the output of the VCO 2454 shown in FIG. 3B. The code phase synchronizing signal is a signal that is transmitted at every period after a half clock from the code start in the code generator 2455.

Figure 6:
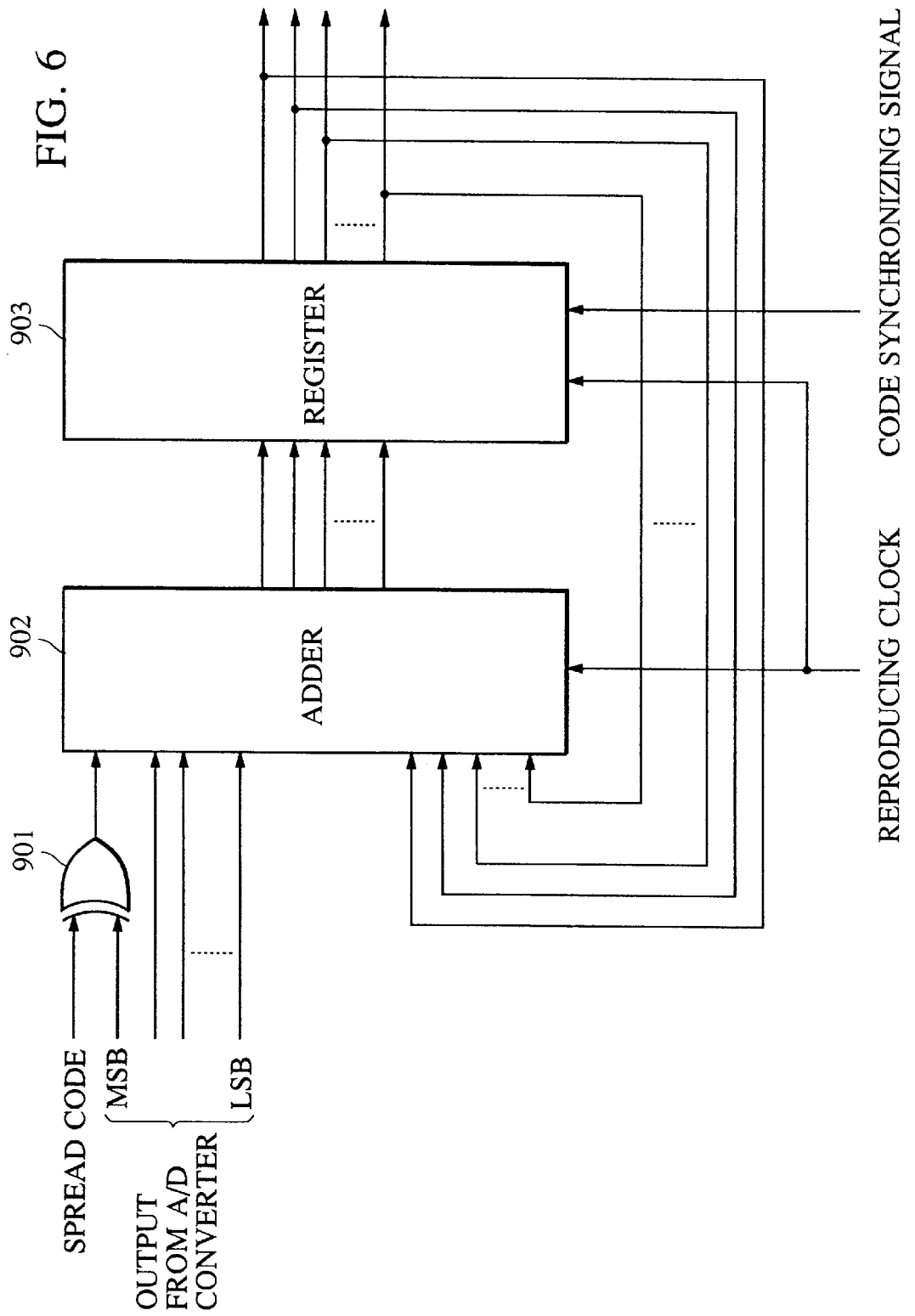
FIG. 6 is a circuit diagram of a correlator 713-1 through 713-n of FIG. 5.

Referring to FIG. 5, the supplied signals in the channels Ich and Qch are converted into digital signals, each having a resolving power of a single bit or plural bits, by A/D converters 711 and 712, the basic period of which is the same as the reproducing clock. The digital signal is distributed into n pieces so as to be supplied, together with a plurality of spread codes transmitted by the code generator 4B, to the correlators 713-1 to 713-n and correlators 714-1 to 714-n so that their correlations are calculated. FIG. 6 shows an example of the structure of the correlators 713 and 714.

Referring to FIG. 6, the uppermost bit MSB (code bit) of a single bit or plural-bit digital signal transmitted by the A/D converter 711 or 712 is, in an exclusive OR circuit 901, subjected to a calculation for obtaining an exclusive OR with a plurality of spread codes transmitted from the code generator 4B, and is supplied to an adder 902 together with the other bits. In the adder 902, the supplied signal and the output from a register 903 are added at each reproducing clock so as to be respectively transmitted to the register 903. The register 903 is reset simultaneously with the input of each spread signal, and the results of the addition of the received signals and the spread codes are stored for one period of the spread code. Therefore, when the final bit in one period of the spread code has been supplied, the correlation value of the spread code for one period and the received signal are stored.

Data of the foregoing correlation value is discriminated by ensuing discrimination circuits 715-1 to 715-n (FIG. 7) so that n demodulated data items are obtained. N demodulated parallel data items are converted into serial data by a serializer 8.

Figure 7:
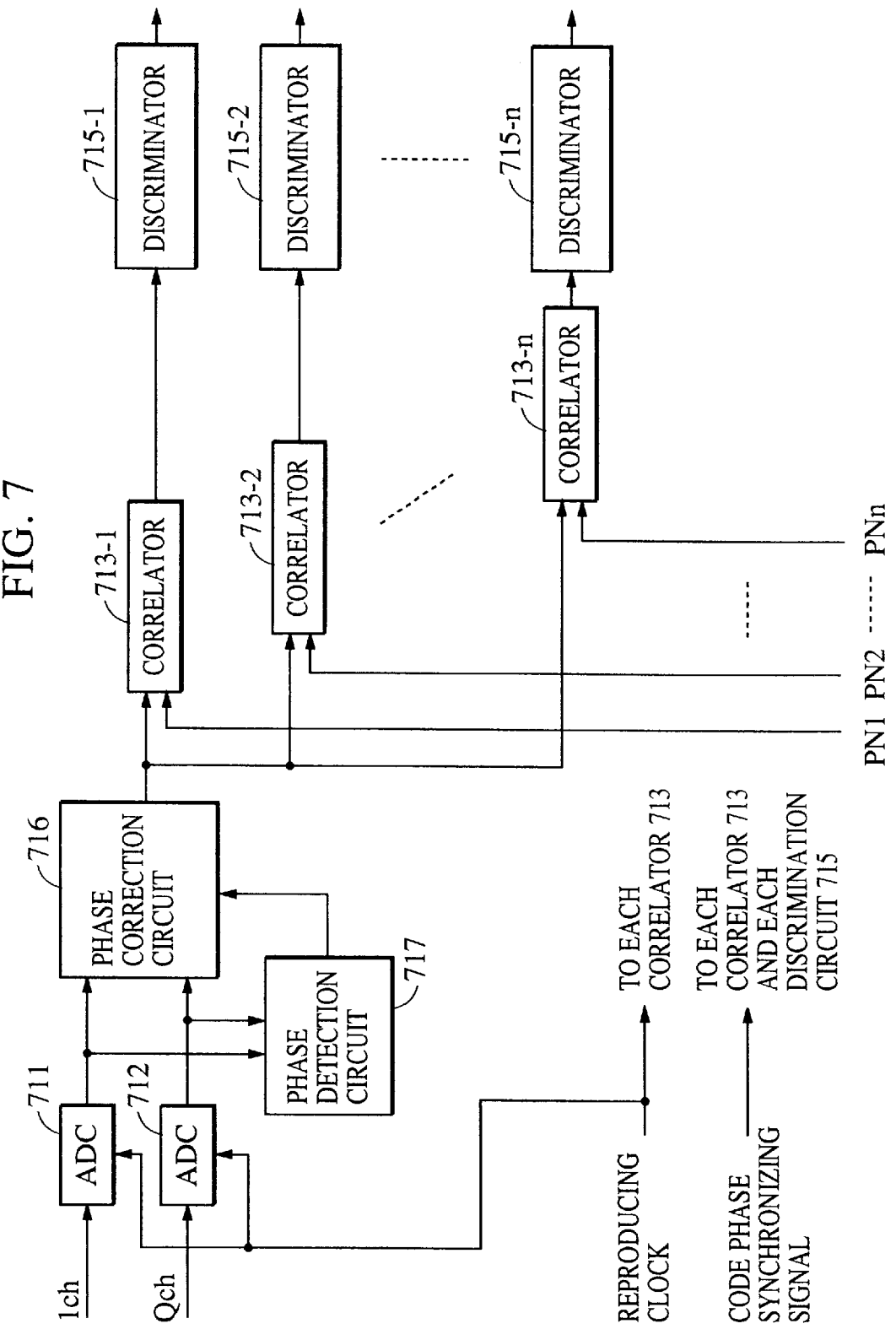
FIG. 7 is a further circuit diagram of the demodulator 7A of FIG. 1, which is adapted to a case where despreading is performed after phase correction.

FIG. 7 shows a third embodiment of the demodulator 7A.

Referring to FIG. 7, the supplied signals in the channels Ich and Qch are, in the A/D converters 711 and 712 the basic period of which is the reproducing clock, converted into digital signals each having a resolving power of a single bit or plural bits. The quantity of the phase shift of the digital signal from the phase of zero degrees is detected by a phase detection circuit 717, and is then supplied to a phase correction circuit 716. In accordance with the quantity of the phase shift, data in the channels Ich and Qch is converted into data modulated by zero degrees to 180 degrees. The output from the phase correction circuit 716 is distributed into n pieces so as to be supplied to the correlators 713-1 to 713-n together with a plurality of spread codes transmitted from the code generator 4B so that their correlations are calculated. Data of the correlation values is discriminated in the ensuing discrimination circuits 715-1 to 715-n so that n demodulated data items are obtained.

In the foregoing first embodiment, the output from the demodulation circuit is converted into series data by the parallel/serial conversion circuit. However, the parallel/serial conversion circuit may be omitted and the output may therefore be transmitted as a plurality of parallel data items.

In the first embodiment, signals in the channels Ich and Qch that have been orthogonally converted are synthesized to discriminate one received data item. Therefore, received data can accurately be discriminated even if the conversion into the quasi-base-band signal has not been performed accurately. The foregoing effect is similar to the following embodiments.

Figure 8B:
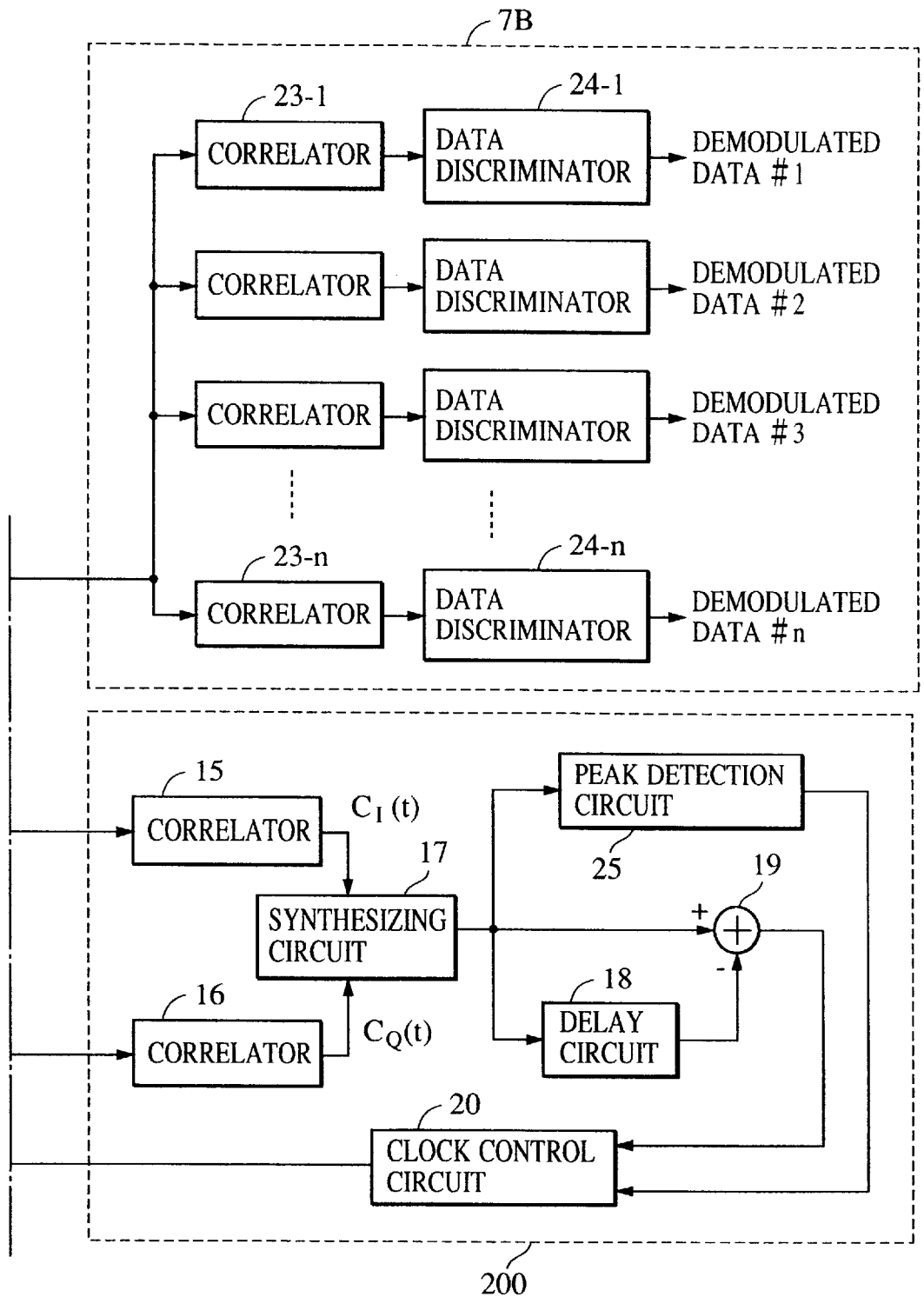

FIGS. 8A and 8B show the structure of a second embodiment of the receiving apparatus according to the present invention. Referring to FIGS. 8A and 8B, reference numeral 1 represents an antenna, and 2 represents a high-frequency signal processor. Reference numeral 6A represents a conversion circuit for converting the received signal into a quasi-base-band signal, the conversion circuit 6A having the same structure as that shown in FIG. 2. Reference numeral 7B represents a demodulator. Reference numerals 13 and 14 represent A/D converters, 200 represents a clock output circuit, 15 and 16 represent correlators for establishing the correlations with desired spread code PNr, 17 represents a synthesizing circuit for synthesizing the correlated outputs from the two correlators 15 and 16, 18 represents a delay circuit for delaying, by a predetermined time (the time corresponding to about one to two chips (bits) of the spread code), the output from the synthesizing circuit 17, 19 represents a subtraction circuit for subtracting the output from the synthesizing circuit 17 and that from the delay circuit 18, and 20 represents a clock control circuit that receives the output from the subtraction circuit 19 to control the phases of sampling clocks to be supplied to the A/D converters 13 and 14. Reference numerals 23-1 to 23-n represent correlators for establishing the correlation among the input signal and the spread codes PN1 to PNn. Reference numeral 24-1 to 24-n represent data discrimination circuits, and 25 represents a peak detection circuit for detecting the peak of the output from the synthesizing circuit 17.

Referring to FIGS. 8A and 8B, the operation of the apparatus according to this embodiment will now be described. Received signal $r(t)\cdot\exp(i\omega t)$ is subjected to amplification and filtering in the high-frequency signal processor 2, and therefore has the input frequency converted into an intermediate frequency which is branched into two pieces so as to be respectively supplied to a first frequency converter 202 and a second frequency converter 203 so that signals $r_I(t)$ and $r_Q(t)$ in the base band region and orthogonal to each other are transmitted. Assuming that the phase difference between the received signal and the output signal from the oscillator 201 is $\alpha$, the two signals are expressed as follows:

$$r_I(t)=r(t)\cos\alpha$$

$$r_Q(t)=r(t)\sin\alpha$$

Then, the signals $r_I(t)$ and $r_Q(t)$ in the base band region are sampled with at a frequency that is two times or higher than the chip speed of the spread code by the A/D converters 13 and 14 so as to be supplied to the correlators 15 and 16, in which correlation-calculations with a desired spread code PNr are performed. The desired spread code PNr is usually the same as the spread code for use in the spread modulation in the transmission unit, that is, the same as any one of PN1 to PNn or the code for only synchronization. Assuming that the outputs from the correlators 15 and 16 are respectively $c_I(t)$ and $c_Q(t)$, the outputs are expressed as follows:

$$c_I(t)=c(t)\cos\alpha$$

$$c_Q(t)=c(t)\sin\alpha$$

where c(t) is the output when signal r(t) is supplied to the correlators 15 and 16.

Figure 9A:
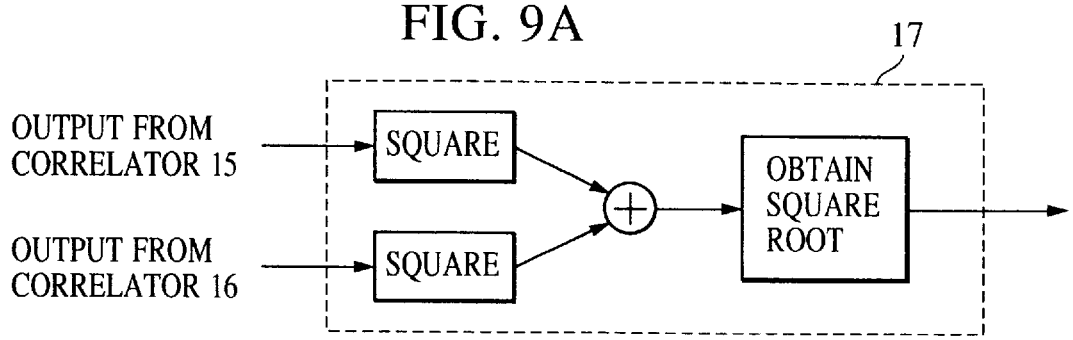
FIGS. 9A–9D are respective circuit diagrams of circuits which may be used as the synthesizing circuit 17 of FIG. 8B.
Figure 9B:
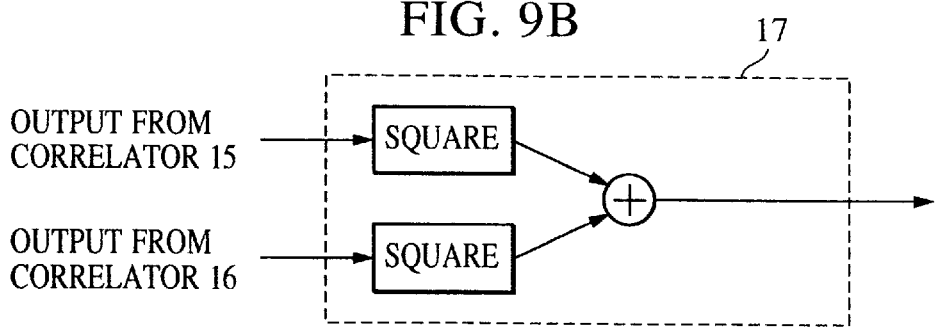
Figure 9C:
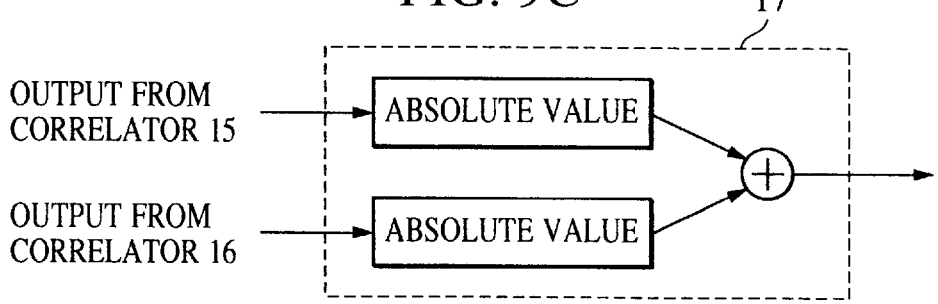
Figure 9D:
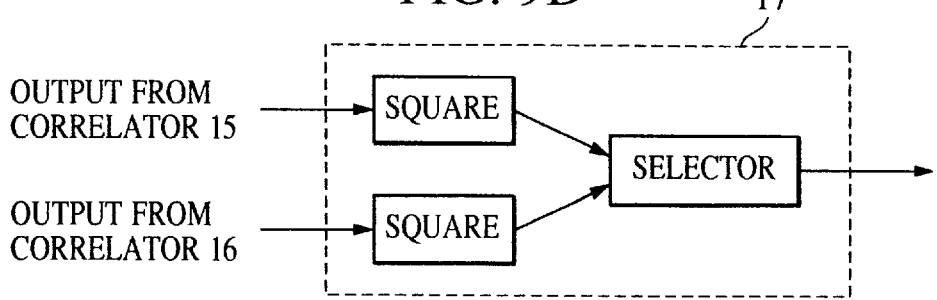

The outputs $c_I(t)$ and $c_Q(t)$ from the two correlators 15 and 16 are synthesized in the synthesizing circuit 17. One example of the synthesizing circuit 17 is shown in FIG. 9A. Referring to FIG. 9A, the outputs $c_I(t)$ and $c_Q(t)$ from the two correlators 15 and 16 are respectively squared and then added so as to obtain the square root. As a result of the calculation for obtaining the square root, the absolute output of c(t) can be obtained. Other examples of the synthesizing circuit 17 are shown in FIGS. 9B, 9C and 9D. In FIG. 9B, the calculation for obtaining the square root in FIG. 9A is omitted to reduce the number of calculations. In FIG. 9C, calculations for obtaining the absolute value are performed in place of the calculations for obtaining the square root so that the number of calculations are further reduced as compared with the structure shown in FIG. 9B. In FIG. 9D, a selector for selecting either of the two signals is provided in place of performing the addition so that the number of calculations is still further reduced as compared with the structure shown in FIG. 9C.

The output from the synthesizing circuit 17 is branched into two pieces so that subtraction of the signal allowed to pass through the delay circuit 18 from the signal that is not allowed to pass through the delay circuit 18 is performed in the subtraction circuit 19. Referring to FIGS. 10A–10C, the operation will now be described in detail. FIGS. 10A–10C show an example in which 1 chip (bit)-2 sampling is performed and the quantity of delay of the delay circuit 18 is 1 chip, that is, 2 sampling, and black dots show the sampling points. Dashed lines indicate the analog quantities, that is, the case where the sampling frequency is infinite. In a case where the phase of the sampling clock is delayed as shown in FIG. 10A, the quantity of delay from point $t_0$, at which the output from the synthesizing circuit 17 is made maximum in one period to the half of the delay circuit 18, that is, the output from the subtraction circuit 19 at point $t_1$ after ½ bit (1 sampling) is negative. In a case where the phase of the sampling clock is ahead as shown in FIG. 10B, the output from the subtraction circuit 19 at point $t_1$ is positive. Furthermore, since the level of the output indicates the degree of the shift, control is performed so that the output from the subtraction circuit 19 at point $t_1$ approaches zero, which enables the clock phase to be synchronized.

Accordingly, the output from the subtraction circuit 19 is received at point $t_1$ (that is, the time (detected by a peak detection circuit 25) at which the maximum value in one period of the output from the synthesizing circuit 19 is given to the time after the half of the quantity of delay of the delay circuit 18), and the phase of the sampling clock is controlled by the clock control circuit 20 so that the clocks are synchronized.

The clock control circuit 20, as shown in FIG. 11A, comprises, for example, a delay circuit 20A, a latch 20B, a filter 20C, a digital/analog (D/A) converter 20D and a voltage control oscillator (VCO) 20E. The order of the filter 20C and the digital/analog (D/A) converter 20D may be changed. Another example of the clock control circuit 20 may be employed, as shown in FIG. 11B, in which the phase of the signal transmitted from a reference signal generator 20F is shifted by the output from the subtraction circuit 19 so as to transmit it as clocks.

The delay time realized by the delay circuit 20A is half of the delay time realized by the delay circuit 18. The latch 20B latches the output from the subtraction circuit 19 when the delay time realized by the delay circuit 20A has passed from the peak of the output from the synthesizing circuit 17. The clock control circuit 20 so controls the clocks as to reduce the output from the latch 20B.

In this embodiment, if synchronization has been established, the outputs from the two A/D converters 13 and 14 (FIG. 8A) are thinned to 1 chip (bit)-1 sampling by a thinning/synthesizing circuit 22 so that the phase difference α between the received signal and the output signal from the oscillator is corrected. The synthesis is performed similarly to that performed by the phase correction circuit 716 shown in FIG. 7 such that calculation $r_1(t)\cos \alpha + r_Q(t)\sin \alpha$ is performed. The output from the thinning/synthesizing circuit 22 is branched into n pieces so that correlation with n different spread codes $PN_1$ to $PN_n$ used in the spread demodulation in the transmission unit is established in n correlators 23-1 to 23-n, followed by being respectively demodulated by data discrimination circuits 24-1 and 24-n so that n demodulated data items are obtained. The data discrimination circuits 24-1 to 24-n discriminate data for each period of the spread code in synchronization with the peak detected by the peak detection circuit 25.

As a result of the structure according to this embodiment, the shift of the sampling clock can be corrected by a small-size structure. Furthermore, since the thinning/synthesizing circuit 22 thins data to 1 chip (bit)-1 sampling, the size of each of the ensuing n correlators 23-1 to 23-n can be reduced.

In the second embodiment, the serial-parallel converter for converting high-speed data into a plurality of parallel data items is added to the transmission unit, and the serializer for converting a plurality of demodulated parallel data items into serial data is added to the receiving unit. Thus, data can be transmitted at high speed.

In the second embodiment, information can be transmitted by orthogonal modulation. If orthogonal modulation is performed, information is converted into an orthogonal signal, the phase difference α of which has been corrected by the thinning/synthesizing circuit 22, so as to establish the correlation in the n correlators so that the data is discriminated.

Figure 12:
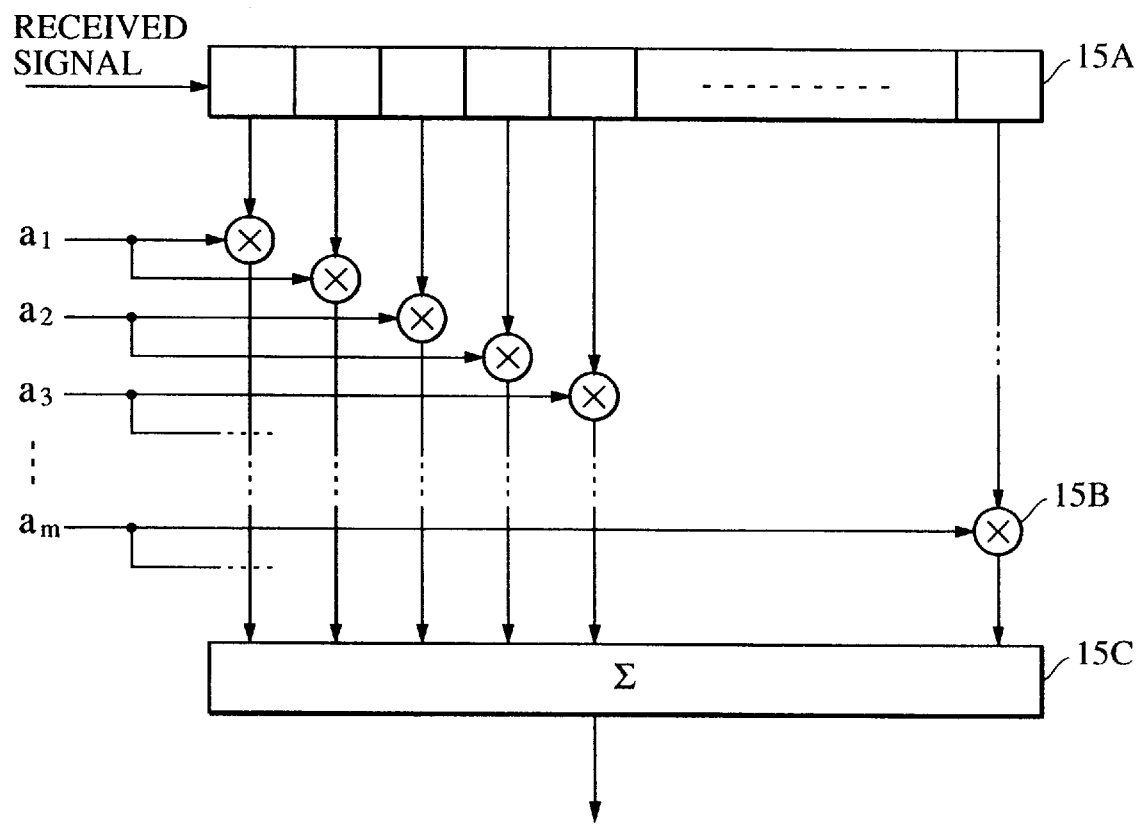
FIG. 12 is a circuit diagram of the correlators 15 and 16 of FIG. 8B.

FIG. 12 shows the structure of the correlators 15 and 16 for use in the case of 1 chip (bit)-2 sampling. If the spread code is m bits, a shift register 15A is a 2×m bits shift register that shifts, by each bit, the outputs from the A/D converters 13 and 14 in synchronization with the clock CLK supplied from the clock control circuit 20. The correlators 15 and 16 further comprise 2×m multipliers for multiplying data stored in the shift register 15A and each bit of the spread code ($a_1$, $a_2$, $a_3$, . . . , $a_m$); and an adder 15C for adding the outputs from the multiplier 15B so as to transmit the added outputs as correlated values.

Figure 13:
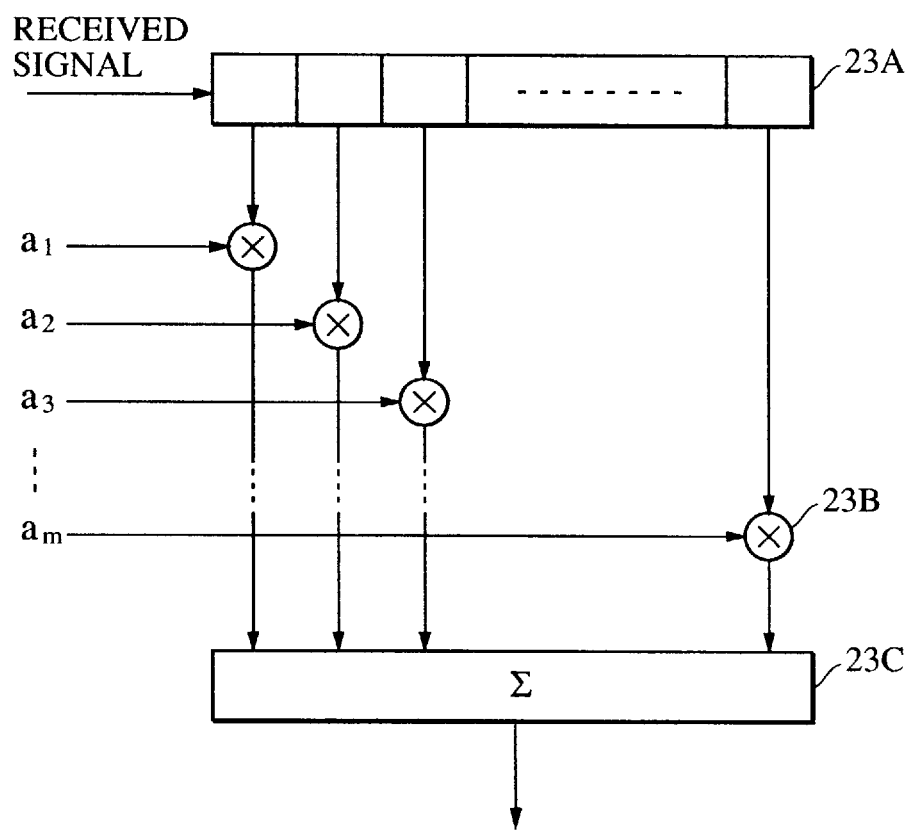
FIG. 13 is a circuit diagram of a correlator which may be used as the correlators 23-1 through 23-n of FIG. 8B.

FIG. 13 shows the structure of the correlators 23-1 to 23-n (FIG. 8B). Reference numeral 23A represents a m-bit shift register, 23B represents m multipliers for multiplying data stored in the shift register 23A and each bit of the spread codes ($a_1$, $a_2$, $a_3$, . . . , $a_m$), and 23C represents an adder for adding the outputs from the multiplier 23B to transmit the result as a correlated value. The adder 23C, at each period of the spread code, transmits the result of the addition in accordance with the peak detection performed by the peak detection circuit 25. The correlators 23-1 to 23-n respectively receive different spread codes, whereas the correlators 15 and 16 receive the same spread code.

The structure of the correlators 23-1 to 23-n may be structured as shown in FIG. 6.

Note that the correlators 15 and 16 use the output clock CLK supplied from the clock control circuit 20 to perform calculations for establishing the correlation. That is, assuming that the frequency of the output clock from the clock control circuit 20 is $f_c$, the correlators 15 and 16 perform the calculations for establishing the correlations in synchronization with the clock CLK having the frequency $f_c$.

The correlators 23-1 to 23-n use clocks obtained by halving the output clock CLK from the clock control circuit 20 to perform the calculations for establishing the correlations. That is, the correlators 23-1 to 23-n perform the calculations for establishing the correlations in synchronization with the clock which is the half (if 1 chip (bit)-1 sampling is employed, 1/l) of the frequency $f_c$.

Note that the clocks to be supplied to the correlators 23-1 to 23-n are generated by dividing the output clocks from the clock control circuit 20 so that the correlation calculation is performed when the peak is generated in the output from the synthesizing circuit 17 (at time $t_0$ shown in FIG. 10C).

The thinning/synthesizing circuit 22 thins and synthesizes the outputs from the A/D converters 13 and 14 to 1 clock-1 sampling so as to cause the outputs from the A/D converters 13 and 14 to be transmitted while being synthesized when the peak is generated in the output from the synthesizing circuit 17.

As described above, since the clock frequencies of the despreading correlators 23-1 to 23-n are made lower than the clock frequencies of the correlators 15 and 16 for correctly sampling the received signal, sampling can be performed accurately and despreading can be realized by a small-size structure.

It is preferable that the quantity of delay realized by the delay circuit 18 is the time that corresponds to about 1 to 2 chips of the spread code, as described above. Although the quantity of delay may be one chip in a state where about 1 chip (bit)-2 sampling structure is employed, it is preferable that the quantity of delay be 2 chips if the sampling frequency is high.

Figure 14:
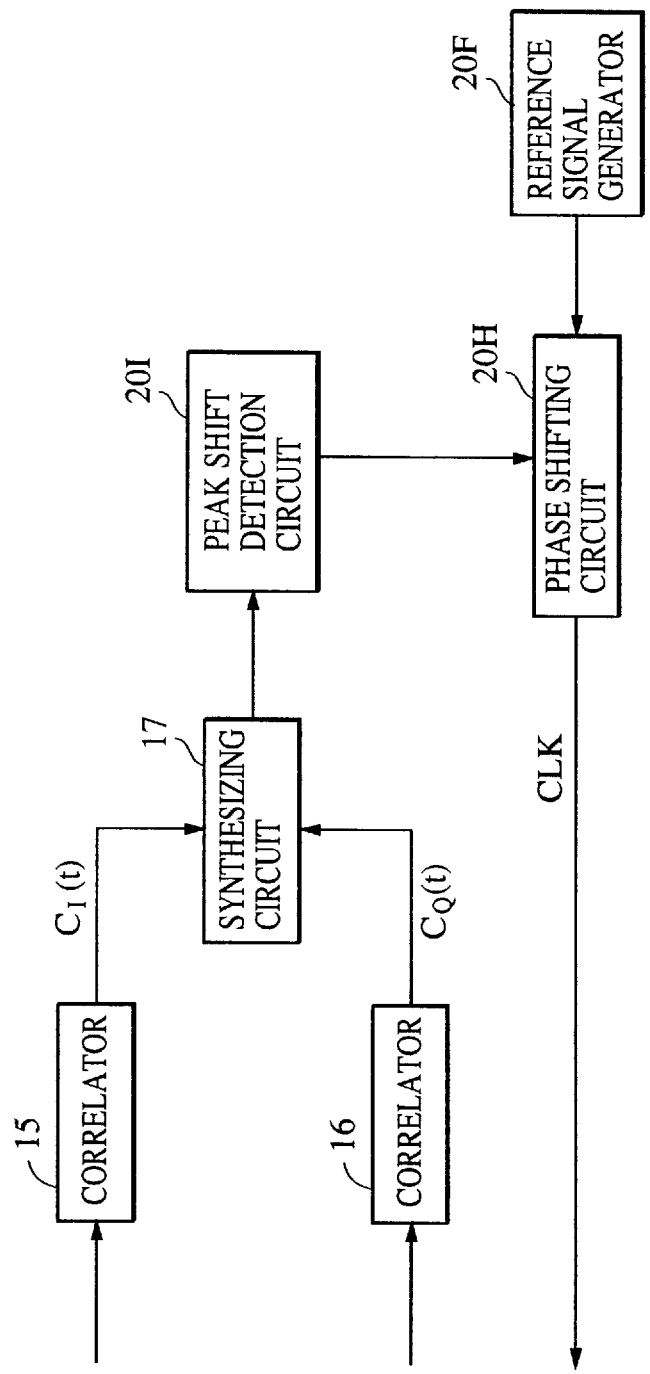
FIG. 14 is a circuit diagram showing a modification of the clock output circuit 200 of FIG. 8B.

FIG. 14 shows another example of the clock output circuit 200 (see FIG. 8B). Referring to FIG. 14, the same elements as those shown in FIG. 8B are given the same reference numerals.

Reference numeral 20I represents a peak shift detection circuit for detecting the quantity of the peak shift from the output from the synthesizing circuit 17, 20F represents a reference signal generating circuit, and 20H represents a phase shifting circuit that receives the output from the peak shift detection circuit 20I to generate a sampling clock that shifts the phase of the output signal from the reference signal generating circuit 20F to supply the phase-shifted clock to the A/D converters 13 and 14 (FIG. 8A).

Figure 15:
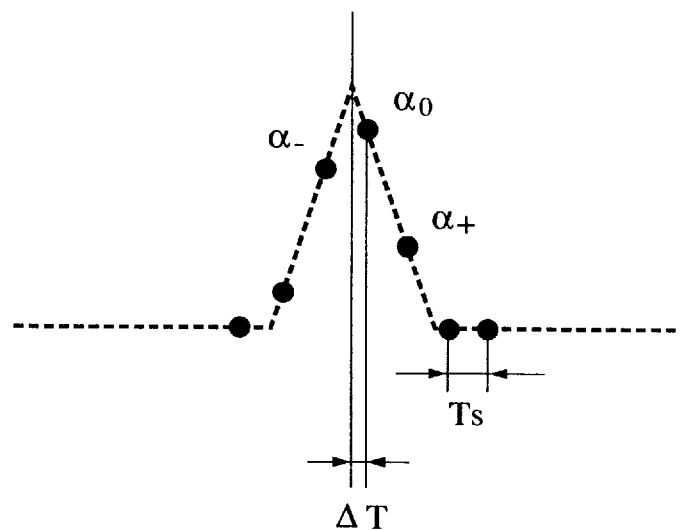
FIG. 15 is a waveform graph showing the output from the synthesizing circuit 17 shown in FIG. 14.

The output from the synthesizing circuit 17 is supplied to the peak shift detection circuit 20I so that the quantity of the peak shift is transmitted. The operation will now be described in detail with reference to FIG. 15. FIG. 15 shows an example in which a 1 chip (bit)-2 sampling method is employed, and sampling points near the peak output are indicated by black dots. Dashed lines show the case of a continuous-time sampling. If the continuous-time sampling is performed, the correlation peak is in the form of an isosceles triangle as indicated by a dashed line. Since discrete time sampling takes place due to A/D conversion, a discrete value having a sampling period $T_S$ as indicated by the black dots is realized. Accordingly, maximum value $\alpha_0$ in one period of the output from the synthesizing circuit 17 is detected, and a shift ΔT between the time, at which the maximum value $\alpha_0$ is taken, and the true peak position is obtained from values $\alpha_-$ and $\alpha_+$ at the sampling points before and after the time at which the maximum value $\alpha_0$ is taken by using the following equation:

$$\Delta T/T_S = (\alpha_- - \alpha_+)/(2 \cdot \Delta\alpha)$$

where $\Delta\alpha$ is the larger of ($\alpha_0 - \alpha_-$) or ($\alpha_0 - \alpha_+$).

The phase shifting circuit 20H (FIG. 14) shifts the phase of the output from the reference signal generator 20F in accordance with the quantity of the shift transmitted by the peak shift detection circuit 20I to transmit the sampling clock, that has been synchronized, to the A/D converters 13 and 14.

Figure 16:
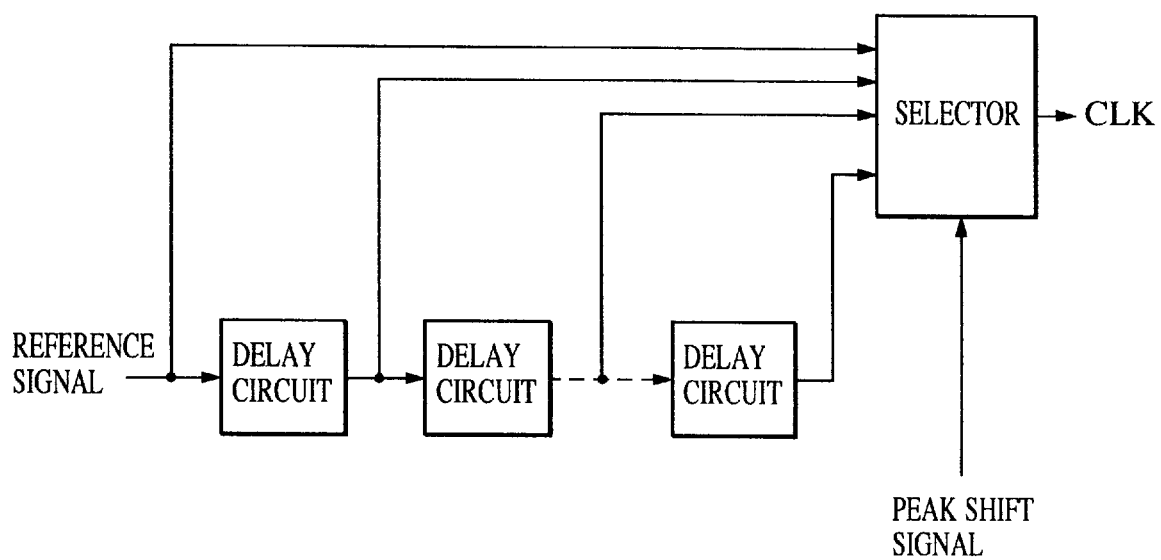
FIG. 16 is a circuit diagram of the phase shifting circuit 20H of FIG. 14.

An example of the phase shifting circuit 20H is shown in FIG. 16. In FIG. 16, the delay circuits are continuously connected to generate a plurality of signals having different amounts of delay which are selected by a selector.

If a highly-stable oscillator, such as a TCXO (Temperature Compensation Crystal Oscillator), is used as the reference signal generator 20F and a clock is selected from 8 to 16 signals having different amounts of delay, synchronization can be established accurately. In particular, a significant effect can be obtained in the transmission, such as packet transmission, in which the data length is limited.

When the clock synchronization has been established, the synthesizing circuit 17 extracts the output from the two correlators 15 and 16 at point t1 so as to obtain the amplitude and/or phase from the two signals so that demodulation of data is performed.

By detecting the shift of the peak by the peak shift detection circuit 20I plural times to detect the average value, a central value or the most probable frequency, influence of noise can be determined.

Figure 17:
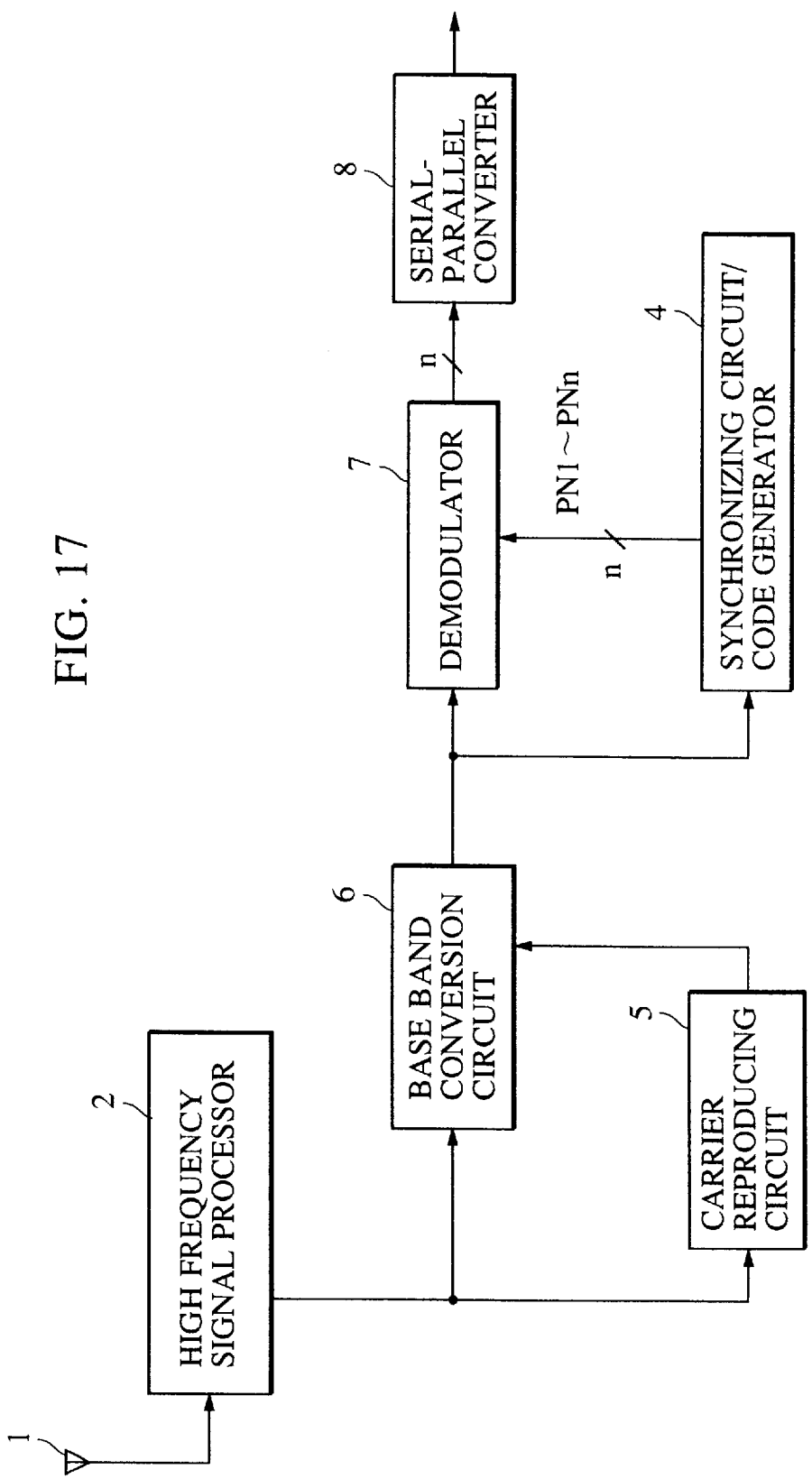
FIG. 17 is a diagram showing the structure of a third embodiment of the present invention in which synchronization with a base-band signal is established.

FIG. 17 shows the structure of a third embodiment of the present invention. Referring to FIG. 17, reference numeral 1 represents an antenna, 2 represents a high-frequency signal processor for processing, at a high frequency stage thereof, the signal received by the antenna 1, 4 represents a synchronizing circuit for capturing and maintaining the synchronization with the code and clock in the transmission side; and a code generator for generating n spread codes for demodulating data and spread codes for synchronization from a code synchronizing signal and a clock signal, 5 represents a carrier reproducing circuit for extracting a carrier from the received signal, 6 represents a base-band conversion circuit for converting the received signal into a base-band signal by using the reproducing carrier, 7 represents a demodulator that uses the base-band signal transmitted from the base-band conversion circuit 6 and n spread codes transmitted from the code generator 4 to demodulate data, and 8 represents a parallel/serial conversion circuit for converting n parallel data items into serial data.

Referring to FIG. 17, the signal received by the antenna 1 is supplied to the high-frequency signal processor 2. The received signal is then converted into an intermediate frequency by the high-frequency signal processor 2. The output from the high-frequency signal processor 2 is supplied to the carrier reproducing circuit 5 and the base band conversion circuit 6.

Figure 18:
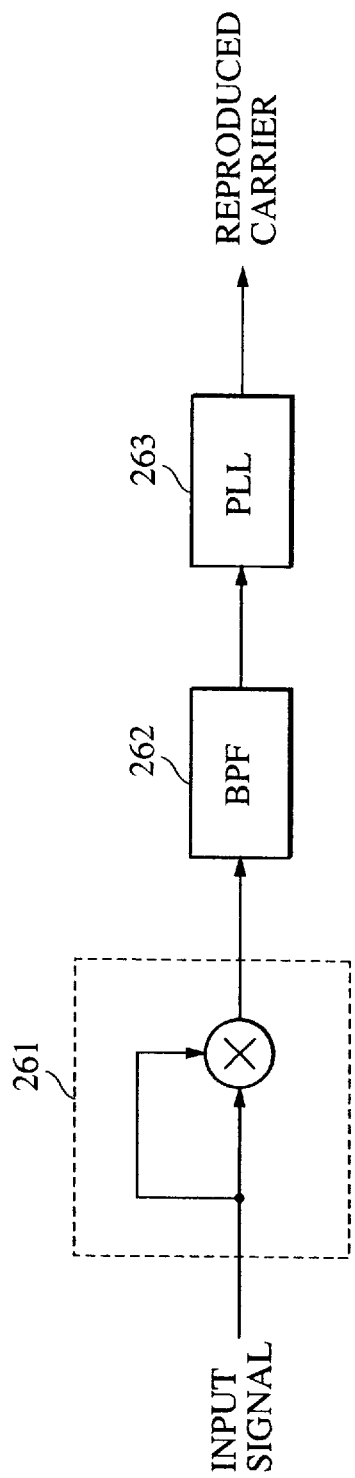
FIG. 18 is a circuit diagram of the carrier reproducing circuit 5 of FIG. 17.

The carrier reproducing circuit 5 extracts the carrier from the output from the high-frequency signal processor 2. FIG. 18 shows an embodiment of the structure of the carrier reproducing circuit 5. The input signal is squared by a squaring circuit 261, a filter 262 extracts the carrier having the doubled frequency, and a PLL 263 halves the same, so that the carrier is reproduced. The reproduced carrier is supplied to the base-band conversion circuit 6 so that the output from the high-frequency signal processor 2 is converted into a base-band signal. The base-band conversion circuit 6 comprises, for example, a mixer for multiplying the output from the high-frequency signal processor 2 and the output from the carrier reproducing circuit 5, and a low-pass filter for removing unnecessary components from the output from the mixer. The carrier reproducing circuit 5 will be described later with reference to FIG. 28.

The base-band signal transmitted from the base-band conversion circuit 6 is supplied to a synchronizing circuit/code generator 4 and a demodulator 7. The synchronizing circuit/code generator 4 uses the spread code PNr for synchronization to establish the synchronization of the code and the clock with respect to those of the transmitted signal. It is preferable that spread code PNr for synchronization be a selected code that corresponds to one of a plurality of multiplexed codes. The synchronizing circuit/code generator 4 has a similar structure to that according to the first embodiment shown in FIG. 3. Since no orthogonal component exists, the circuit corresponding to Qch and the synthesizing circuits 2433, 2452A and 2452B are not required. After the synchronization has been established, the code generator 4 generates n spread codes PN1, . . . , PNn for demodulating data, the clock and code phase of which coincide with those of the received signal.

The n spread codes PN1, . . . , PNn for demodulating data transmitted by the code generator 4 are, together with the base-band signal transmitted by the base-band conversion circuit 6, supplied to the demodulator 7 so that the correlations with the base-band signals are calculated. Thus, n data items are demodulated.

The demodulator 7 may have a structure similar to that shown in FIG. 4. Since no orthogonal component exists, the circuits 702-1 through 702-n and 704-1 through 704-n corresponding to Qch are not required.

The demodulator 7 may have a structure similar to that shown in FIGS. 5 and 6. Since no orthogonal component exists, the circuits 712 and 714-1 through 714-n corresponding to Qch are not required.

Figure 19:
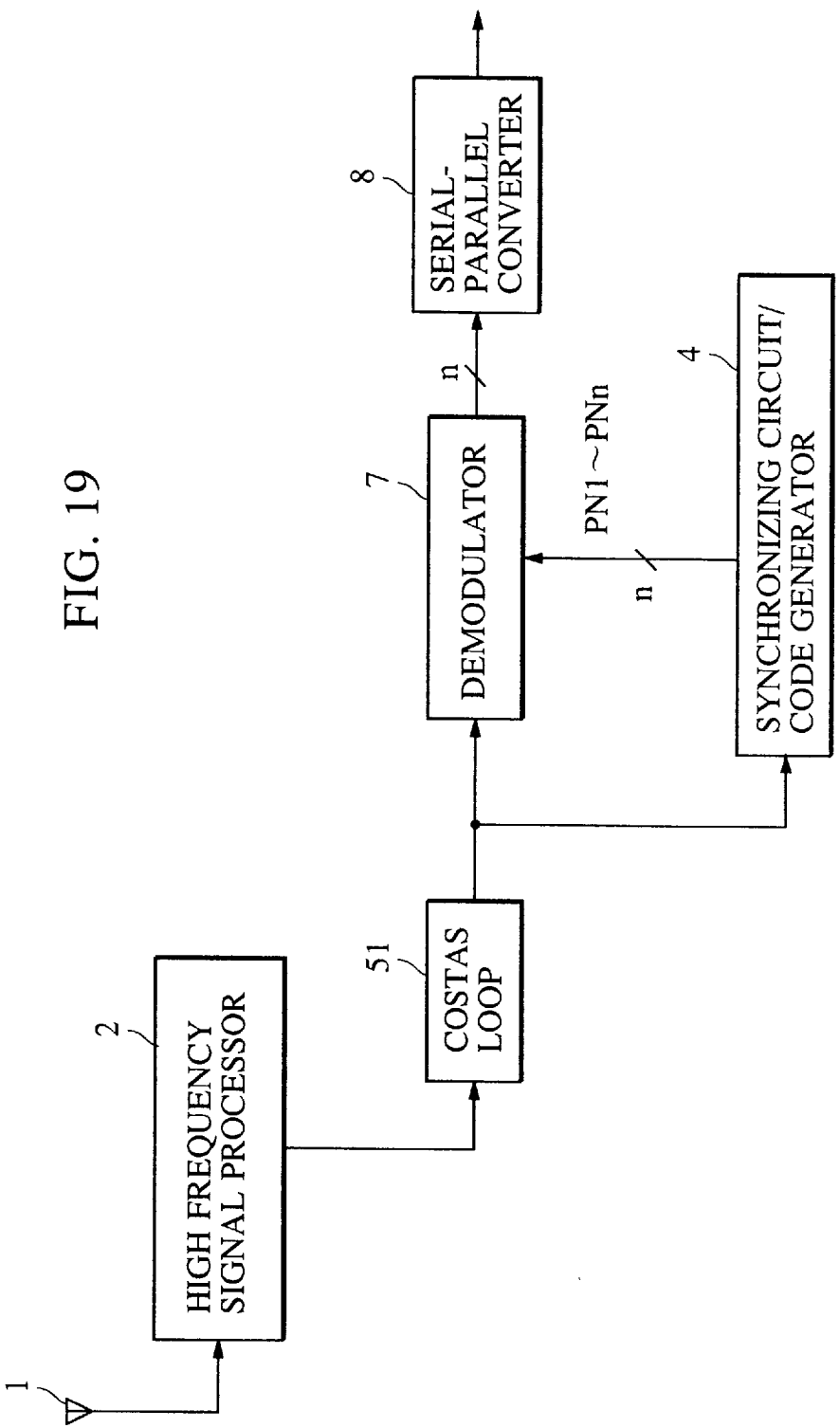
FIG. 19 is a diagram showing the structure of a fourth embodiment of the present invention which includes a costas loop.

FIG. 19 shows the structure of a fourth embodiment in which a costas loop 51 is provided in place of the carrier reproducing circuit 5 and the base-band conversion circuit 6. Referring to FIG. 19, the same elements as those according to the third embodiment shown in FIG. 17 are given the same reference numerals.

Figure 20:
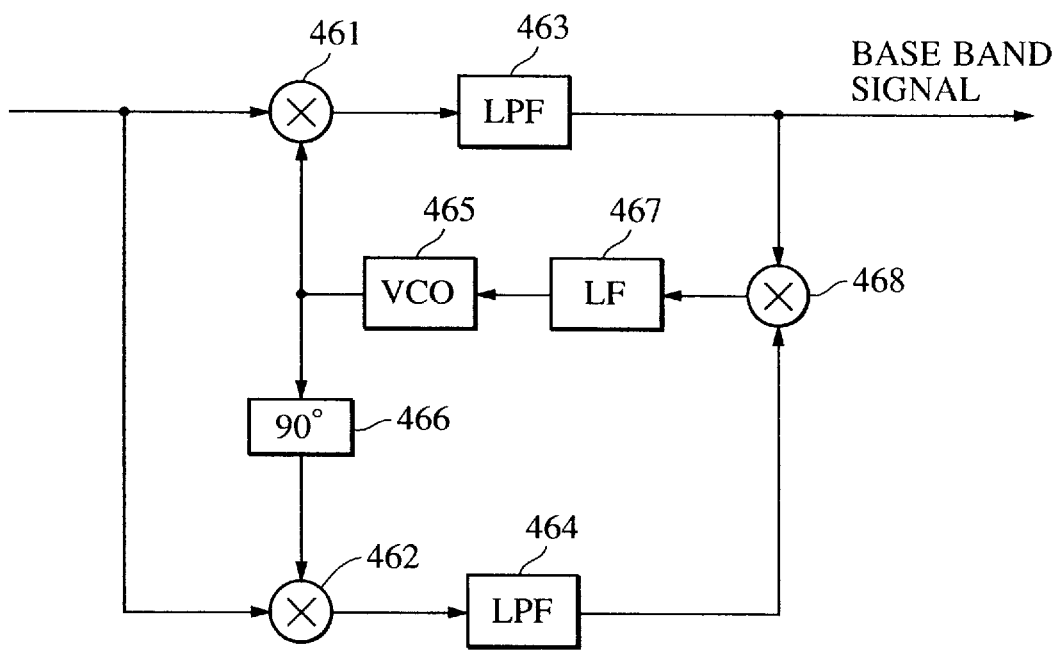
FIG. 20 is a circuit diagram of the costas loop 51 of FIG. 19.

FIG. 20 shows the structure of the costas loop. Referring to FIG. 20, the input signal is branched into two pieces so as to be respectively transmitted to mixers 461 and 462. The mixer 461 is also supplied with the output from a voltage-control oscillator 465, while the mixer 462 is supplied with the output from the voltage-control oscillator 465 after the output has been allowed to pass through a phase converter 464. The mixer 461 transmits the same phase component (Ich) as that of the input signal, while the mixer 462 transmits the orthogonal component (Qch). The foregoing output signals are respectively supplied to low-pass filters 463 and 464, followed by being supplied to a mixer 468. The output from the mixer 468 is allowed to pass through a loop filter 467 so as to be fed back to the voltage-control oscillator 465. As a result of the foregoing structure, the carrier of the input signal is reproduced by the voltage-control oscillator 465, while the base-band signal is transmitted from the low-pass filter 463. The foregoing base-band signal is supplied to the demodulator 7.

Figure 21:
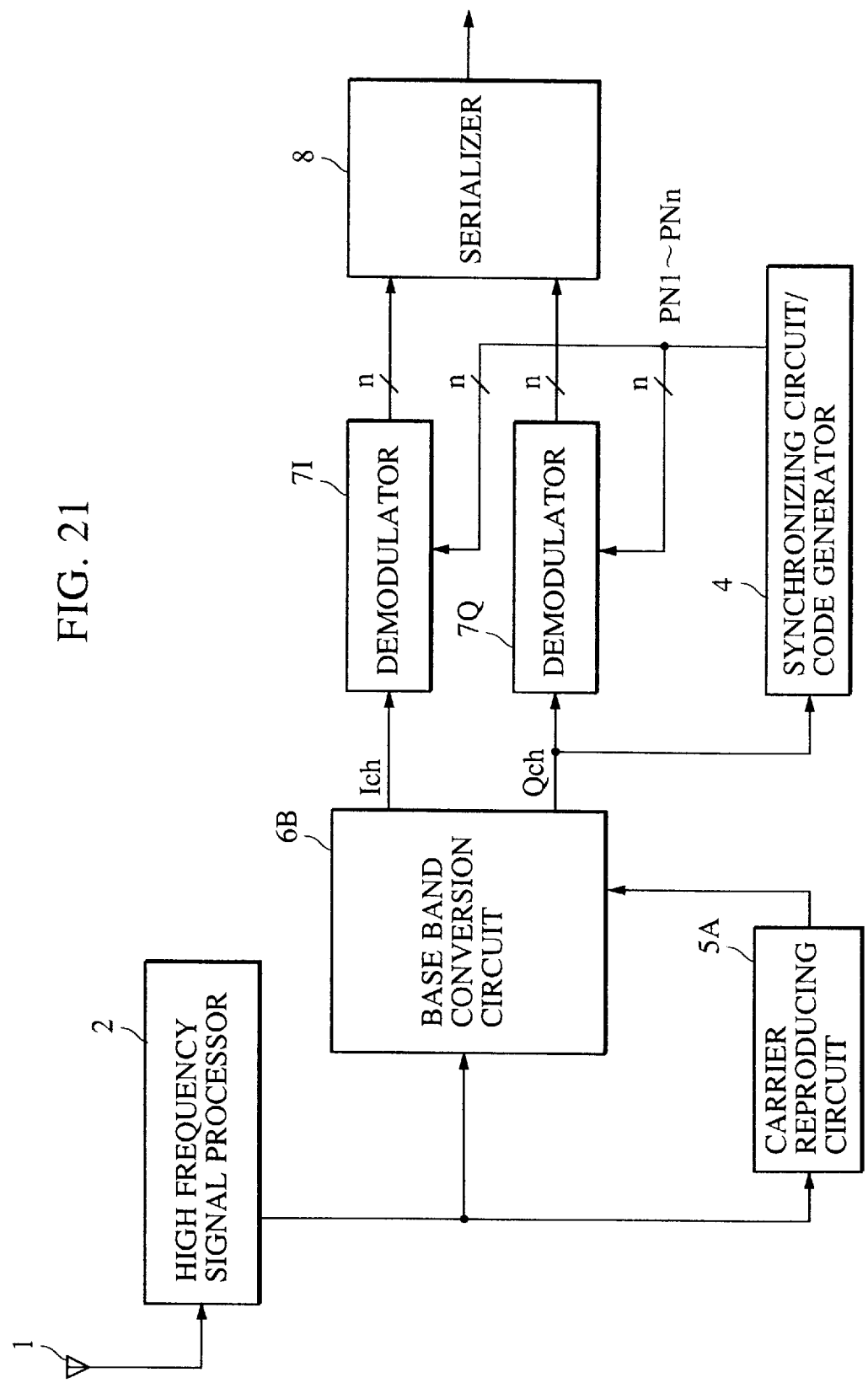
FIG. 21 is a diagram showing the structure of a fifth embodiment of the present invention which is adapted to orthogonal modulation.

FIG. 21 shows the structure of a fifth embodiment of the receiving apparatus according to the present invention. In this embodiment, the same elements as those according to the third embodiment are given the same reference numerals. The fifth embodiment is adapted to a case where the transmission signal is an orthogonal modulation signal. The orthogonal modulation signal can be obtained by modulating the signals in the two channels, that is, the channels Ich and Qch, by carrier waves that are orthogonal to each other and by synthesizing the modulated signals.

Referring to FIG. 21, since the antenna 1, the high-frequency signal processor 2, and the synchronizing circuit/ code generator 4 are the same as those according to the third embodiment, their descriptions are omitted. A carrier reproducing circuit 5A has a structure in which it multiplexes the input signal by, for example, four, followed by causing the same to pass through the filter, and then the same is divided by four. The reproducing carrier transmitted from the carrier reproducing circuit 5A is supplied to the base-band conversion circuit 6B so that the input signal from the high-frequency signal processor 2 is converted into base-band signals in the two channels, that is, the channels Ich and Qch.

Figure 22:
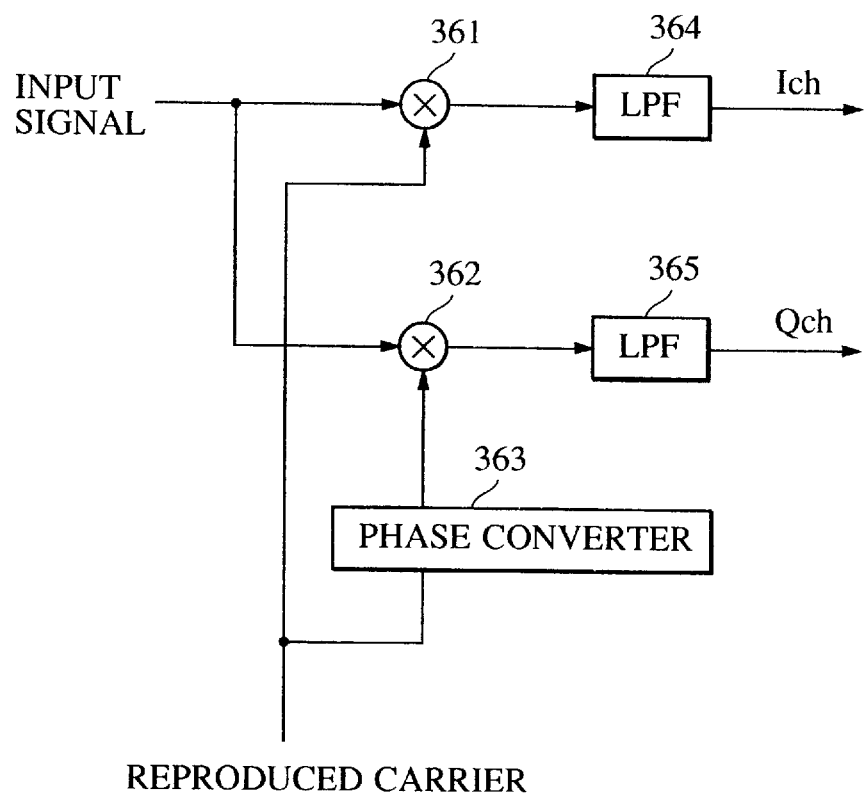
FIG. 22 is a diagram showing the structure of the base-band conversion circuit 6B of FIG. 21.

FIG. 22 shows an example of the structure of the base-band conversion circuit 6B. The input signal is branched into two pieces so as to be respectively transmitted to mixers 361 and 362. In the mixer 361, the reproducing carrier from the carrier reproducing circuit 5A is multiplied, followed by being allowed to pass through a low-pass filter 364. Thus, the same phase component (Ich) of the input signal is extracted. The mixer 362 is supplied with the reproducing carrier through a 90°-phase converter 363 so as to be multiplied by the input signal, followed by being allowed to pass through a low-pass filter 365. Thus, the orthogonal component (Qch) of the input signal is extracted.

The base-band signals in the channels Ich and Qch are, together with n spread codes PN1, . . . , PNn for demodulating data transmitted by the code generator 4, supplied to demodulators 7I and 7Q so as to be correlated with the respective spread codes for demodulating data. Thus, n data items are demodulated.

The demodulators 7I and 7Q have the same structures as those according to the third embodiment shown in FIG. 17.

N parallel data items demodulated by the demodulators 7I and 7Q are supplied to the serializer 8 so as to be converted into serial data that is then transmitted.

According to this embodiment, information is carried on the two channels, that is, the channels Ich and Qch. Therefore, information transmission capacity that is twice that realized in the third embodiment can be obtained.

The channel Qch may be used for establishing synchronization in place of transmitting data information. In the foregoing case, the demodulator 7Q is not required. The foregoing structure eliminates the influence of data information on the synchronizing information, and stable synchronization can be realized.

Figure 23B:
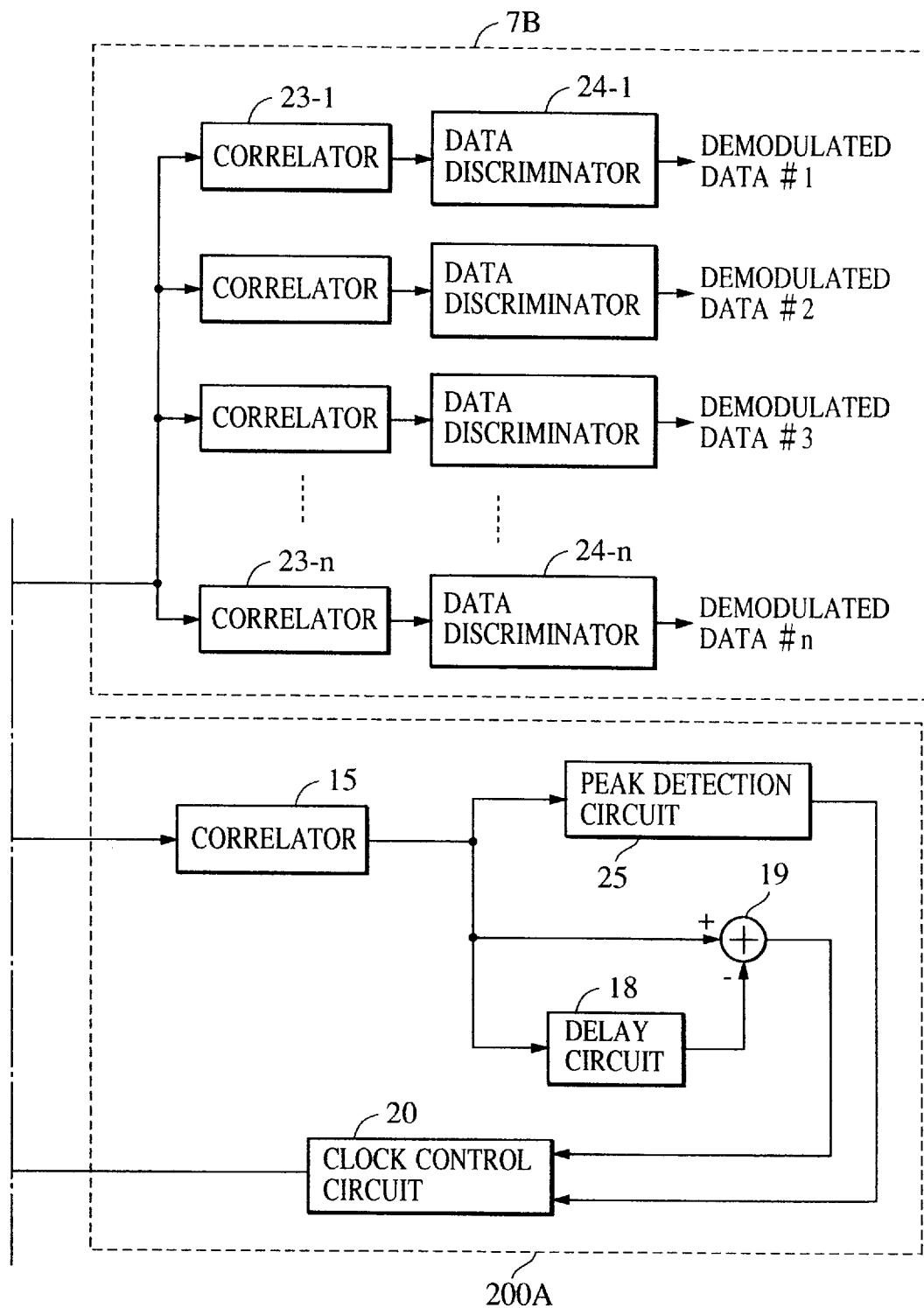

FIGS. 23A and 23B show the structure of a sixth embodiment of the receiving apparatus according to the present invention. In this embodiment, the same elements as those according to the second embodiment shown in FIG. 8 are given the same reference numerals. In this embodiment, a base-band conversion circuit 6 and a carrier reproducing circuit 5 are provided in place of the quasi-base-band conversion circuit 6A. In this embodiment, the peak detection circuit 25 detects the peak of the correlator 15. The delay circuit 18 delays the output from the correlator 15, while the subtraction circuit 19 subtracts the output from the delay circuit 18 from the output from the correlator 15.

A thinning circuit 22A halves the output from the A/D converter 13. The thinning circuit 22A thins the output from the A/D converter so that the output from the A/D converter 13 is transmitted to the correlators 23-1 to 23-n when the output from the correlator 15 generates a peak.

The structure of the carrier reproducing circuit 5 is the same as that shown in FIG. 18. The operations of the A/D converter 13, the clock control circuit 20, the correlators 23-1 to 23-n and the data discrimination circuits 24-1 to 24-n are the same as those according to the second embodiment shown in FIG. 8.

In FIGS. 23A and 23B, a clock output circuit 200A may have the structure similar to that shown in FIG. 14. In the foregoing case, since the Qch is omitted, the correlator 16 and the synthesizing circuit 17 are not required.

In this embodiment, the peak shift detection circuit 20I obtains a shift $\Delta T$ between the maximum value $\alpha_0$ (see FIG. 15) of the output from the correlator 15 and the true peak value. The phase shifting circuit 20H shifts the output clock from the reference signal generator 20F in accordance with the shift $\Delta T$.

Figure 24:
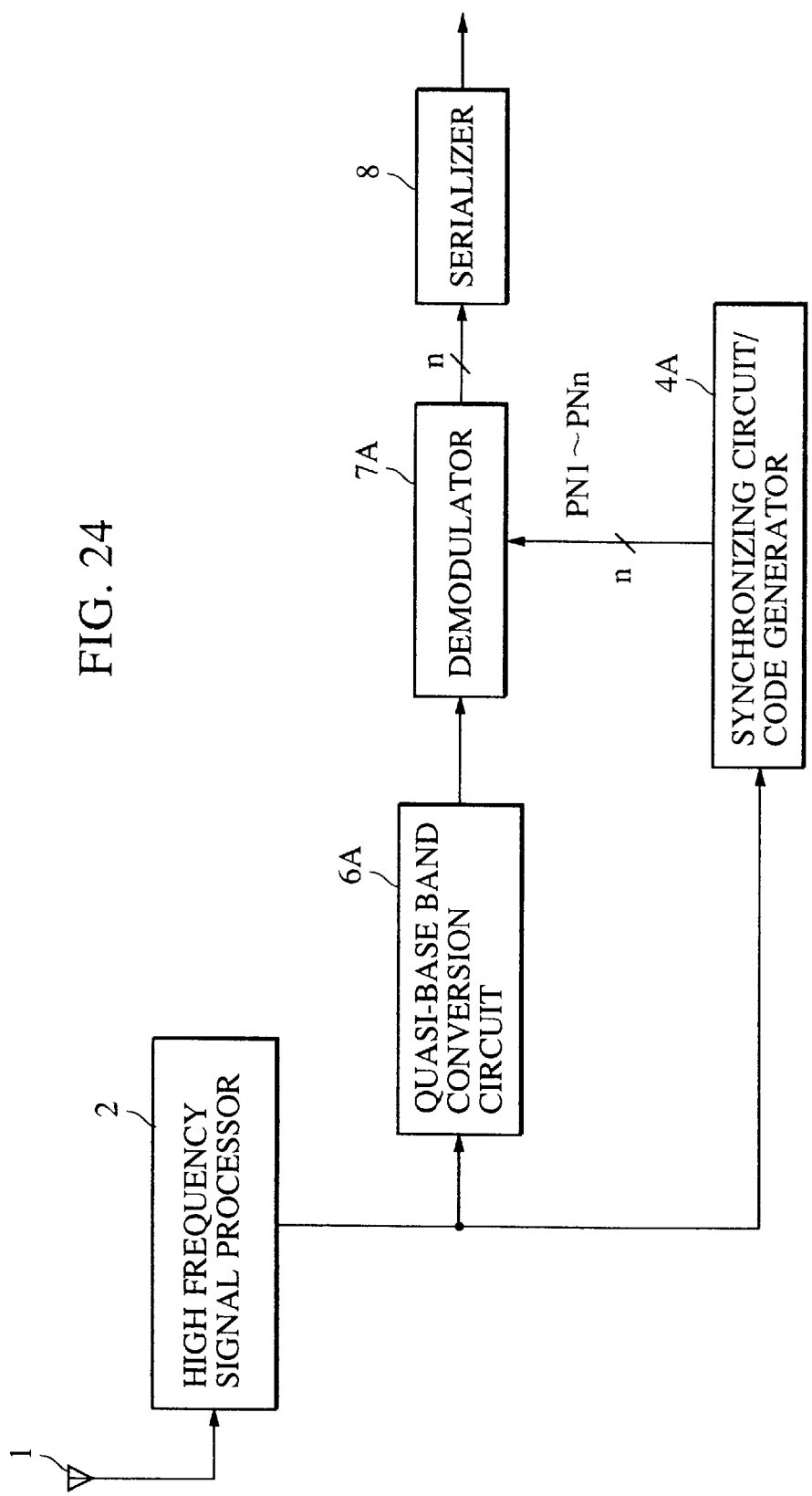
FIG. 24 is a diagram showing the structure of a seventh embodiment of the present invention in which synchronization with an intermediate-frequency signal is established.

FIG. 24 shows the structure of a seventh embodiment of the present invention. Referring to FIG. 24, reference numeral 1 represents an antenna 1, 2 represents a high-frequency signal processor, 4A represents a synchronizing circuit for capturing and maintaining the synchronization of the code and clock with those in the transmission side and code generator for generating n spread codes for demodulating data and n spread codes for synchronization from the code synchronizing signal and the clock signal, 6A represents a quasi-base-band conversion circuit, 7A represents a demodulator that uses the quasi-base-band signal transmitted from the quasi-base-band conversion circuit 6A and n spread codes transmitted from the code generator 4A to demodulate data, and 8 represents a parallel/serial conversion circuit.

Referring to FIG. 24, the received signal received by the antenna 1 is supplied to the high-frequency signal processor 2. The received signal is then converted into an intermediate frequency by the high-frequency signal processor 2. The output from the high-frequency signal processor 2 is supplied to the synchronizing circuit/code generator 4A and the quasi-base-band conversion circuit 6A. The synchronizing circuit/code generator 4A uses the spread code PNr for synchronization to synchronize the code and the clock with those of the transmitted signal so that a code synchronizing signal and a clock signal are transmitted.

Figure 25:
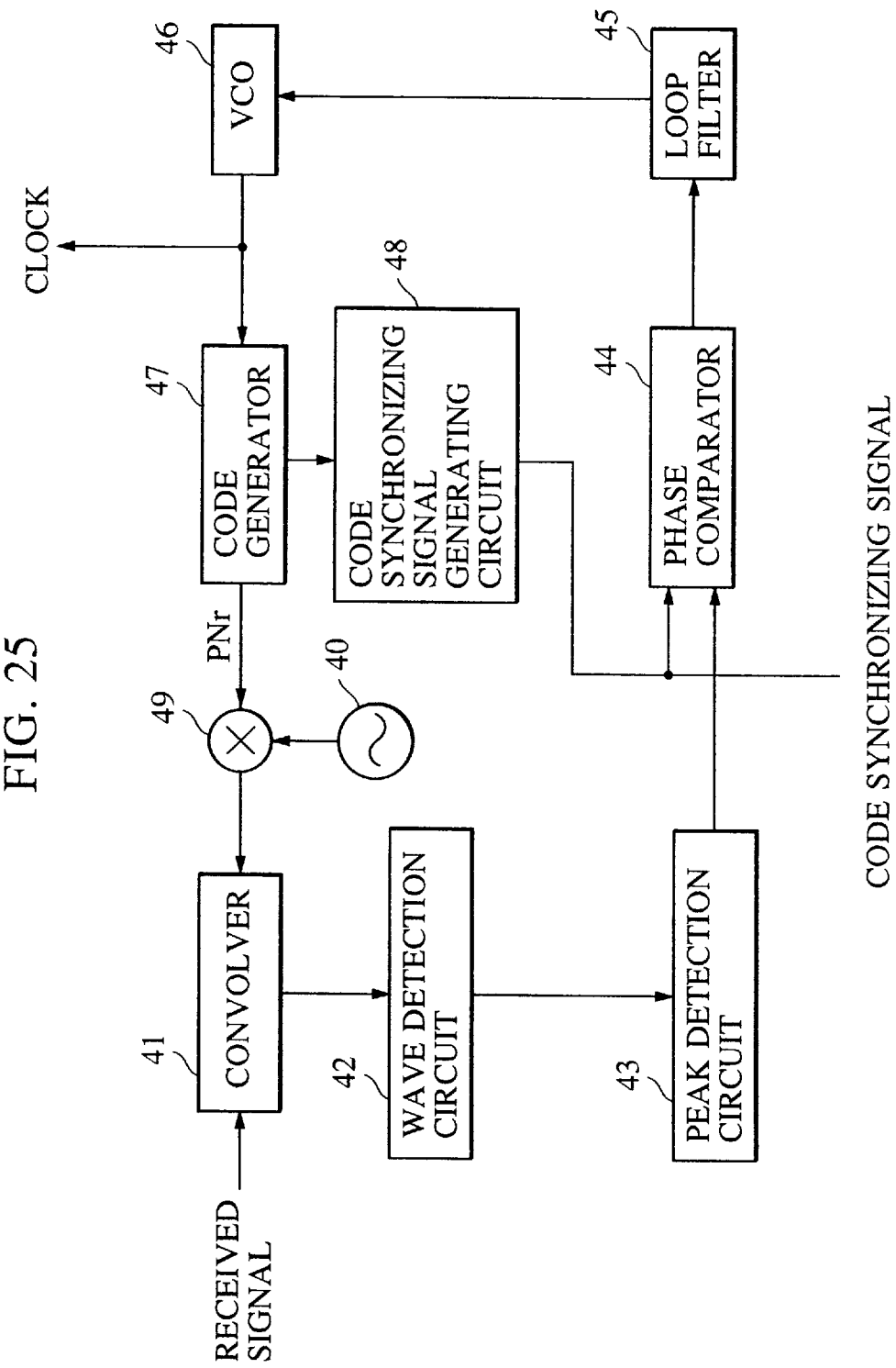
FIG. 25 is a circuit diagram of a convolver which may be utilized as the synchronizing circuit/code generator 4A of FIG. 24.

The synchronizing circuit/code generator 4A may be formed by using a convolver such as an elastic surface wave convolver, as shown in FIG. 25.

Referring to FIG. 25, reference numeral 41 represents a convolver, 42 represents a wave detection circuit, 43 represents a peak detection circuit, 44 represents a phase comparator, 45 represents a loop filter, 46 represents a voltage-control oscillator (VCO), 47 represents a code generator, 48 represents a code synchronizing signal generating circuit for transmitting pulses at the code start point for the spread code PNr for synchronization, 49 represents a mixer and 40 represents a local oscillator.

In a state where the codes have not been synchronized, the VCO 46 oscillates at a frequency near the clock frequency of the spread code PNr for synchronization contained in the received signal.

The peak detection circuit 43 detects the peak of the output from the convolver 41, the wave of which has been detected by the wave detection circuit 42.

The phase comparator 44 transmits, to the VCO 46 through the loop filter 45, a control voltage which determines the code start point of the spread code PNr for synchronization and the peak of the output from the convolver 41.

Thus, the synchronizing circuit/code generator 4A transmits the code synchronizing signal and clocks.

The synchronizing circuit/code generator 4A may be formed as a structure similar to the synchronizing circuit as shown in FIGS. 3A and 3B that comprises the sliding correlator and the delay locked loop circuit.

The structure of the quasi-base-band conversion circuit 6A is the same as that shown in FIG. 2.

The demodulator 7A may be formed similarly to those shown in FIGS. 4 to 7.

Figure 26:
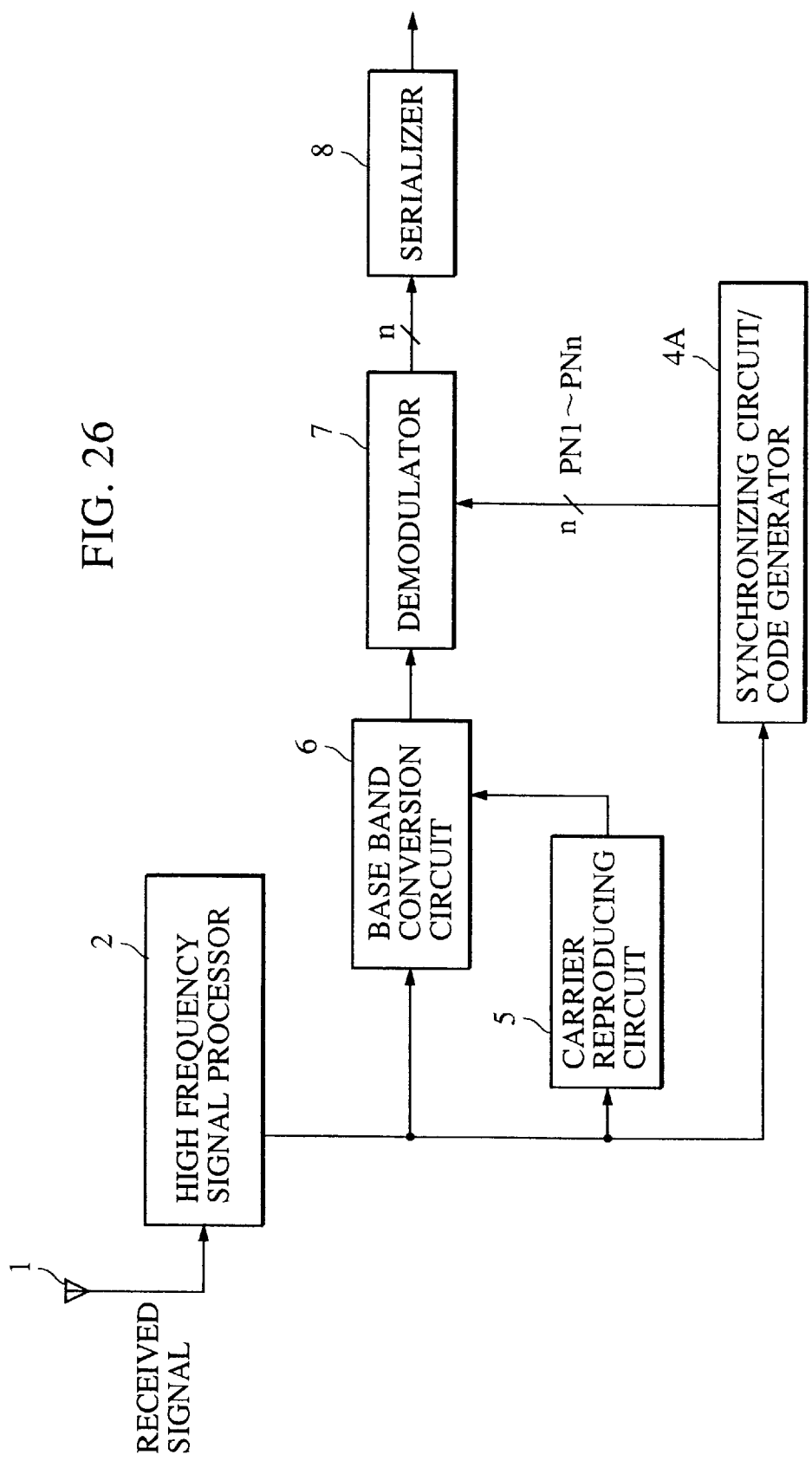
FIG. 26 is a diagram showing the structure of an eighth embodiment of the present invention in which synchronization with an intermediate-frequency signal is established.

FIG. 26 shows the structure of an eighth embodiment of the present invention. Referring to FIG. 26, reference numeral 1 represents an antenna, 2 represents a high-frequency signal processor, 4A represents a synchronizing circuit for capturing and maintaining the synchronization with the code and clock in the transmission side; and a code generator for generating n spread codes for demodulating data and spread codes for synchronization from a code synchronizing signal and a clock signal, 5 represents a carrier reproducing circuit, 6 represents a base-band conversion circuit for converting the received signal into a base-band signal by using the reproducing carrier transmitted by the carrier reproducing circuit 5, 7 represents a demodulator that uses the base-band signal transmitted from the base-band conversion circuit 6 and n spread codes transmitted from the code generator 4A to demodulate data, and 8 represents a parallel/serial conversion circuit.

Referring to FIG. 26, the received signal received by the antenna 1 is supplied to the high-frequency signal processor 2. The received signal is then converted into an intermediate frequency by the high-frequency signal processor 2. The output from the high-frequency signal processor 2 is supplied to the synchronizing circuit/code generator 4A, the carrier reproducing circuit 5 and the base-band conversion circuit 6. The synchronizing circuit/code generator 4A uses spread code PNr for synchronization to synchronize the code and the clock with those of the transmission signal so as to transmit a code synchronizing signal and a clock signal. The structure of the synchronizing circuit/code generator 4A is similar to that according to the seventh embodiment shown in FIG. 24.

The structure of the carrier reproducing circuit 5 is the same as that shown in FIG. 18.

The structure of the demodulator 7 is the same as that according to the third embodiment shown in FIG. 17. The base-band conversion circuit 6 comprises a mixer for multiplying the output from the high-frequency signal processor 2 and the carrier reproducing circuit 5; and a low-pass filter that removes unnecessary components from the output from the mixer to transmit a base-band signal.

Figure 27:
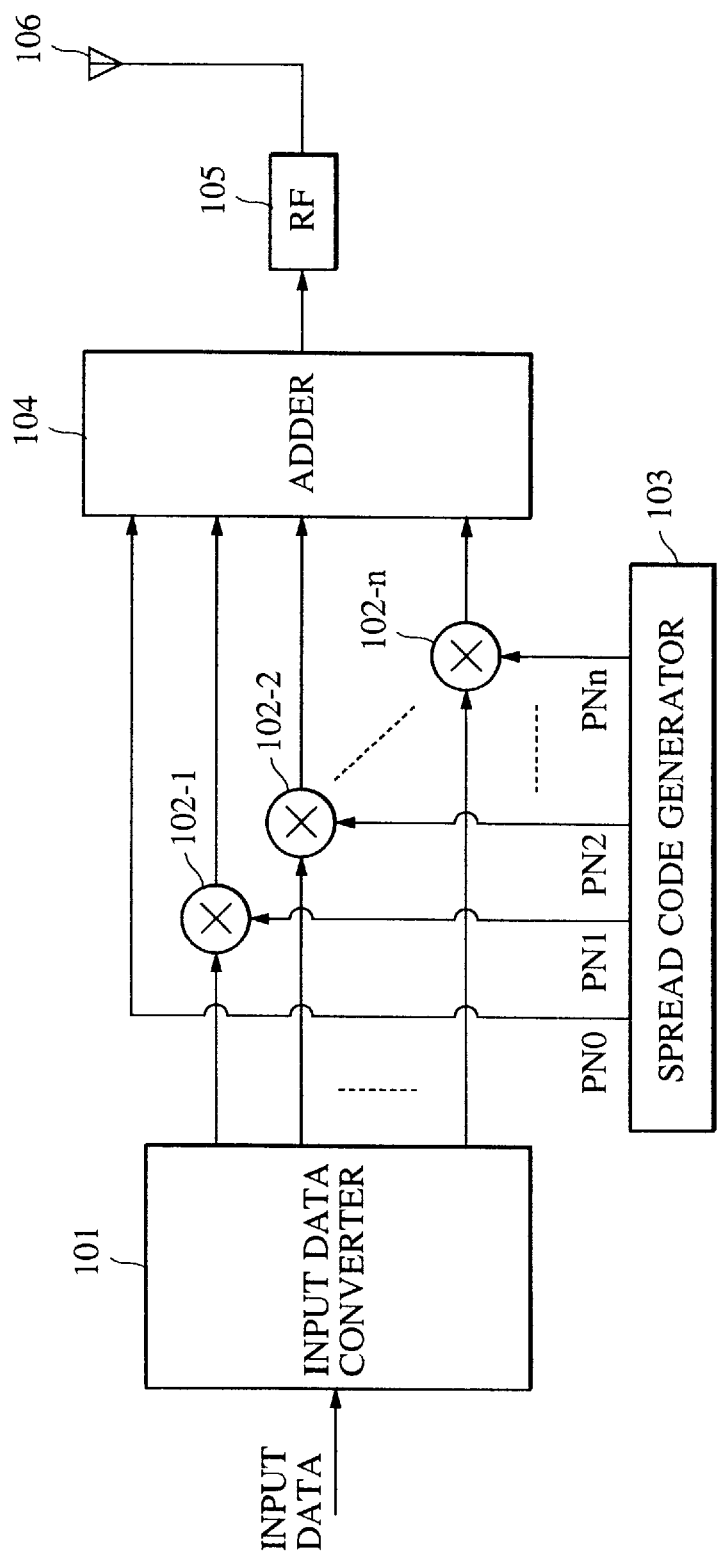
FIG. 27 is a diagram showing the structure of a transmission system.
Figure 28A:
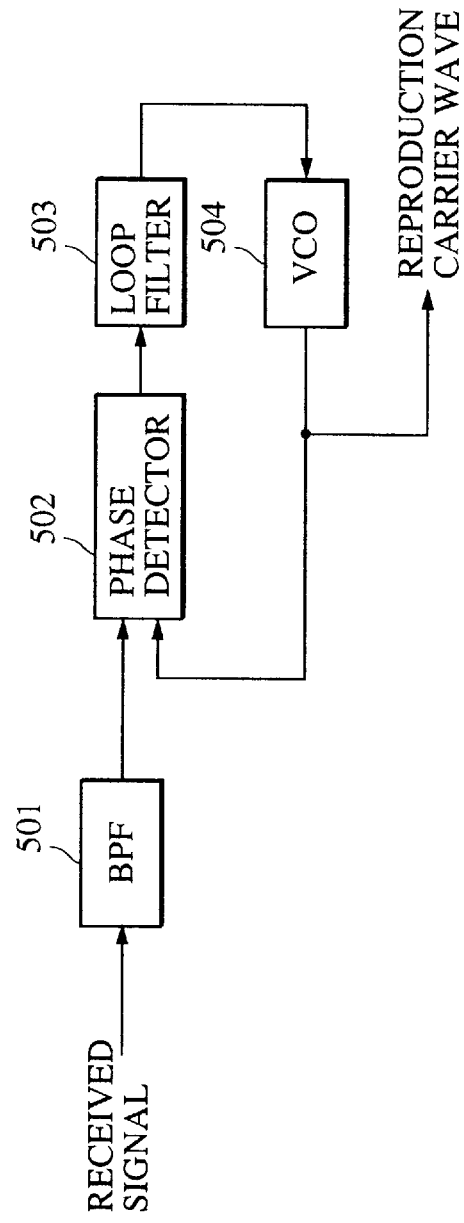
FIGS. 28A and 28B when taken together as shown in FIG. 28 are circuit diagrams showing a modification of the carrier reproducing circuit 5 of FIG. 26.
Figure 28B:
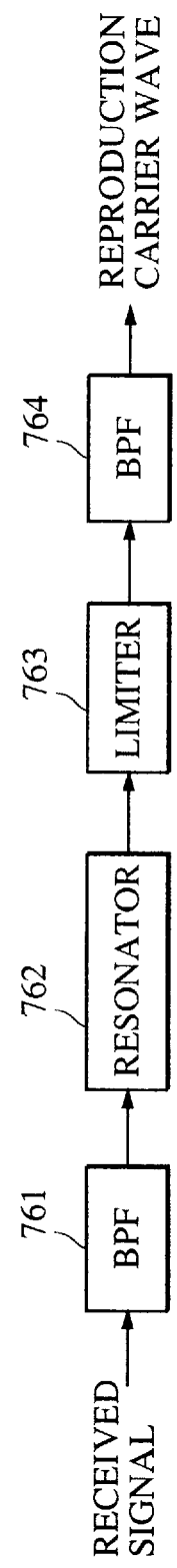

In a case where the transmission side is formed in a structure as shown in FIG. 27, the carrier reproducing circuit 5 may be structured as shown in FIG. 28A or 28B.

FIG. 27 shows the structure of a modified transmitter. Referring to FIG. 27, reference numeral 101 represents a serial-parallel converter for converting data supplied in series into n parallel data items, 102-1 to 102-n represents a multiplier group for multiplying the parallel data and n spread codes PN1 to PNn transmitted by the spread code generator 103, 103 represents a spread code generator for generating different (however having the same length) spread codes PN1 to PNn and a code sequence PN0 only for synchronization in accordance with the same clock and with a common code phase, 104 represents an adder for adding spread code PN0 only for synchronization transmitted from the spread code generator 103 and n outputs from the multiplier group 102-1 to 102-n, 105 represents a high frequency stage for converting the output from the adder 104 into a signal having a frequency for transmission, and 106 represents a transmission antenna. In a case where transmission data is supplied in parallel to the transmitter according to this modification, the serial-parallel converter 101 is not required.

In the foregoing structure, in the transmission unit supplied data is converted by the serial-parallel converter 101 into n parallel data items, that is the same as the number of multiplexing of the code. On the other hand, the spread code generator 103 generates different spread codes PN1 to PNn, the periods of which are the same, and the code sequence PN0 is only for synchronization. The spread codes PN1 to PNn are usually designed in such a manner that the DC component is minimized to prevent the appearance of the carrier frequency component in the transmission spectrum. The code sequence PN0 is used only for synchronization and only for reproducing a carrier, and is not modulated with the foregoing parallel data but is directly supplied to the adder 104. For simplification, PN0 is formed into a code sequence formed by linearly adding the sequence that corresponds to or has a relationship of −1 from a pseudo random sequence having no DC component that is orthogonal to each of PN1 to PNn. However, any code sequence having a DC component may be employed in this embodiment.

The code sequence PN0 may be a code sequence having only a DC component (for example, all "1"). In the foregoing case, code sequence PN0' for synchronizing clocks and phases is required. The n spread codes PN1 to PNn are modulated by n parallel data items in the multiplier group 102-1 to 102-n and supplied to the adder 104. The adder 104 linearly adds the supplied n+1 signals to transmit the added base-band signals to the high-frequency stage 105. The base-band signal is converted into a high frequency signal having an appropriate central frequency by the high-frequency stage 105 so as to be transmitted through the transmission antenna 106. The transmission spectrum is superposed with a carrier wave signal having a predetermined electric power since the modulation signal has a DC component.

A carrier wave component comprising the DC component of the code sequence is used only for synchronization and is superimposed in the transmission spectrum. Therefore, the carrier reproducing circuit 5 is able to directly reproduce the carrier wave having the transmission frequency band or the intermediate frequency band from the received signal which is the output from the high-frequency signal processor 2 and which has been converted into the transmission frequency band or the intermediate frequency band. The carrier reproducing circuit 5 has the structure comprising a circuit using the phase locked loop, for example, as shown in FIG. 28A.

Referring to FIG. 28A, the received signal is supplied to a band pass filter 501 so that only the carrier wave component is filtered before the transmission. The output is then supplied to a known phase locked loop comprising a phase detector 502, a loop filter 503 and a voltage-control oscillator 504. Thus, a signal, in which the phase is locked to the carrier wave component transmitted by the band pass filter 501, is transmitted from the voltage-control oscillator 504 as the reproducing carrier wave. The reproduced carrier wave is supplied to the base-band conversion circuit 6. The base-band conversion circuit 6 generates a base-band signal from the reproduced carrier wave and the output from the high-frequency signal processor 2. The base-band signal is branched into n branches so as to be despread for each code division channel by the spread code group PN1 to PNn, and then data is demodulated.

FIG. 28A shows a structure in which a phase locked loop is used to form the carrier reproducing circuit 5, and FIG. 28B shows a structure in which a resonator is used to form the carrier reproducing circuit 5. Reference numeral 761 represents a band pass filter for permitting only the carrier wave component of the received signal or the received signal having the intermediate frequency to pass through. Reference numeral 762 represents a resonator that resonates with the frequency of the carrier wave, 763 represents a limiter for limiting the signals having levels out of a predetermined voltage range, and 764 represents a band pass filter for removing the high frequency signal appearing in the carrier wave that passed through the limiter 763.

In the foregoing structure, the received signal is supplied to the band-pass filter 761 so that only the carrier wave component is filtered and transmitted. The output is then supplied to the resonator 762 so that the unnecessary frequency component leaked by the band-pass filter 761 is suppressed, and the phase and the amplitude of the carrier wave component are averaged so as to be transmitted to the limiter 763. The limiter 763 limits the amplitude of the output supplied from the resonator 762 so that a signal having a predetermined amplitude appears in the output from the limiter 763. The foregoing signal having the predetermined amplitude has a high frequency component except the frequency of the carrier wave, because its amplitude has been limited by the limiter 763. The signal having the predetermined amplitude is then supplied to the band-pass filter 764 in which the foregoing high frequency component is suppressed. As a result, a signal having the predetermined amplitude and the same frequency as that of the carrier wave component included in the transmission signal, that is, a reproducing carrier wave appears in the output from the band-pass filter 764.

In the eighth embodiment shown in FIG. 26, a costas loop as shown in FIG. 20 may be employed in place of the base-band conversion circuit 6 and the carrier reproducing circuit 5.

Figure 29:
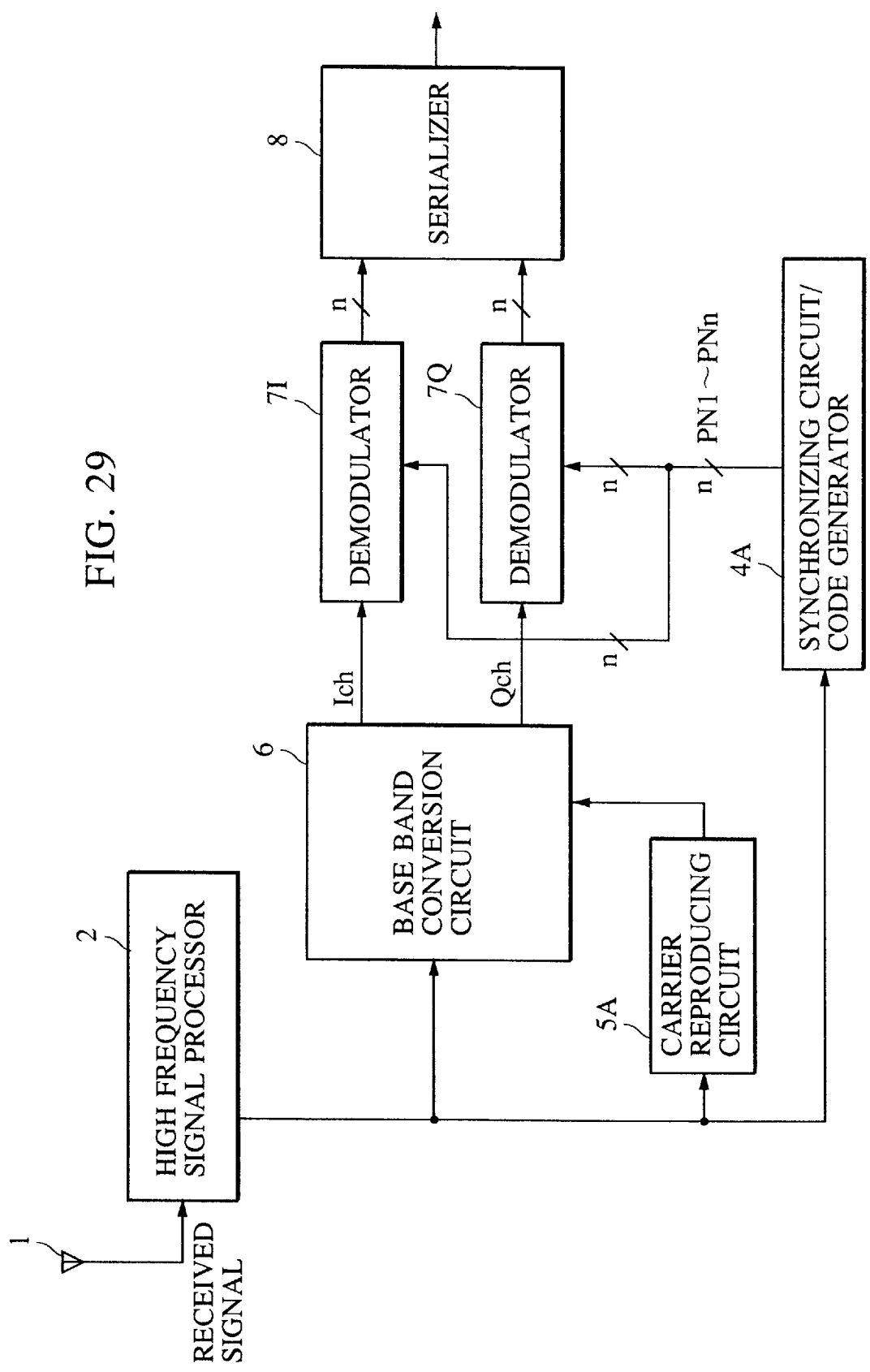
FIG. 29 is a diagram showing the structure of a ninth embodiment of the present invention adapted to orthogonal modulation.

Although the eighth embodiment shown in FIG. 26 employs binary modulation, orthogonal modulation as shown in FIG. 29 may be employed.

FIG. 29 shows a ninth embodiment of the receiving apparatus according to the present invention. In this embodiment, the same elements as those according to the eighth embodiment are given the same reference numerals. The ninth embodiment has a structure in which an orthogonal modulation signal is used as a transmission signal. The orthogonal modulation signal is modulated by a carrier wave in which the signals in the two channels, that is, the channels Ich and Qch, are caused to be orthogonal to each other so as to be synthesized.

Referring to FIG. 29, since the antenna 1, the high-frequency signal processor 2, the synchronizing circuit/code generator 4 are the same as those according to the eighth embodiment shown in FIG. 26, they are omitted from the description below. The carrier reproducing circuit 5A multiplies the input signal by, for example, four, followed by being allowed to pass through the filter, and then it is divided by four. The reproducing carrier transmitted from the carrier reproducing circuit 5A is supplied to the base-band conversion circuit 6B so that the signal supplied from the high-frequency signal processor 2 is converted into base-band signals for the channels Ich and Qch.

The structure of the base-band conversion circuit 6B is the same as that shown in FIG. 22. The structures of the demodulators 7I and 7Q are the same as those shown in FIG. 17.

Figure 30:
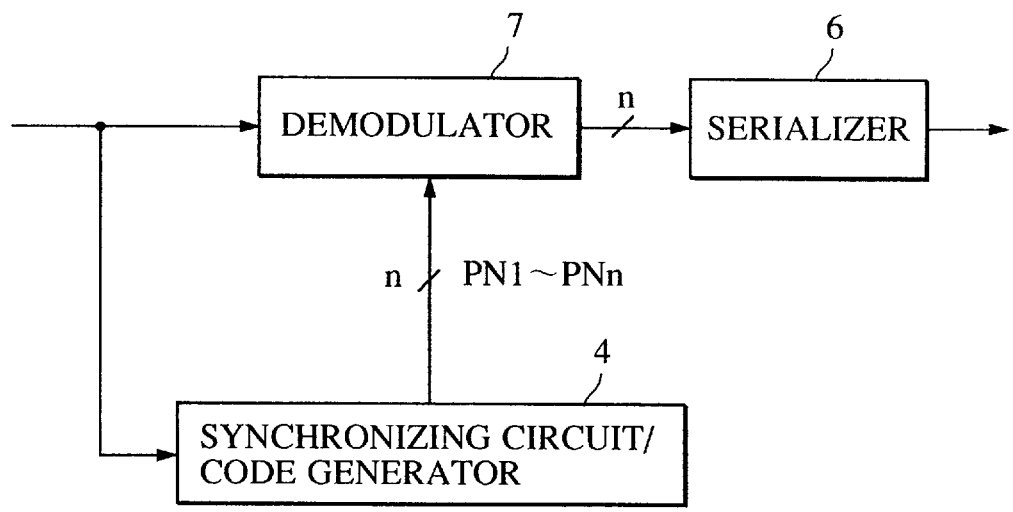
FIG. 30 is a diagram showing the structure of a tenth embodiment of the present invention in which a base-band signal is used to perform communication.
Figure 31:
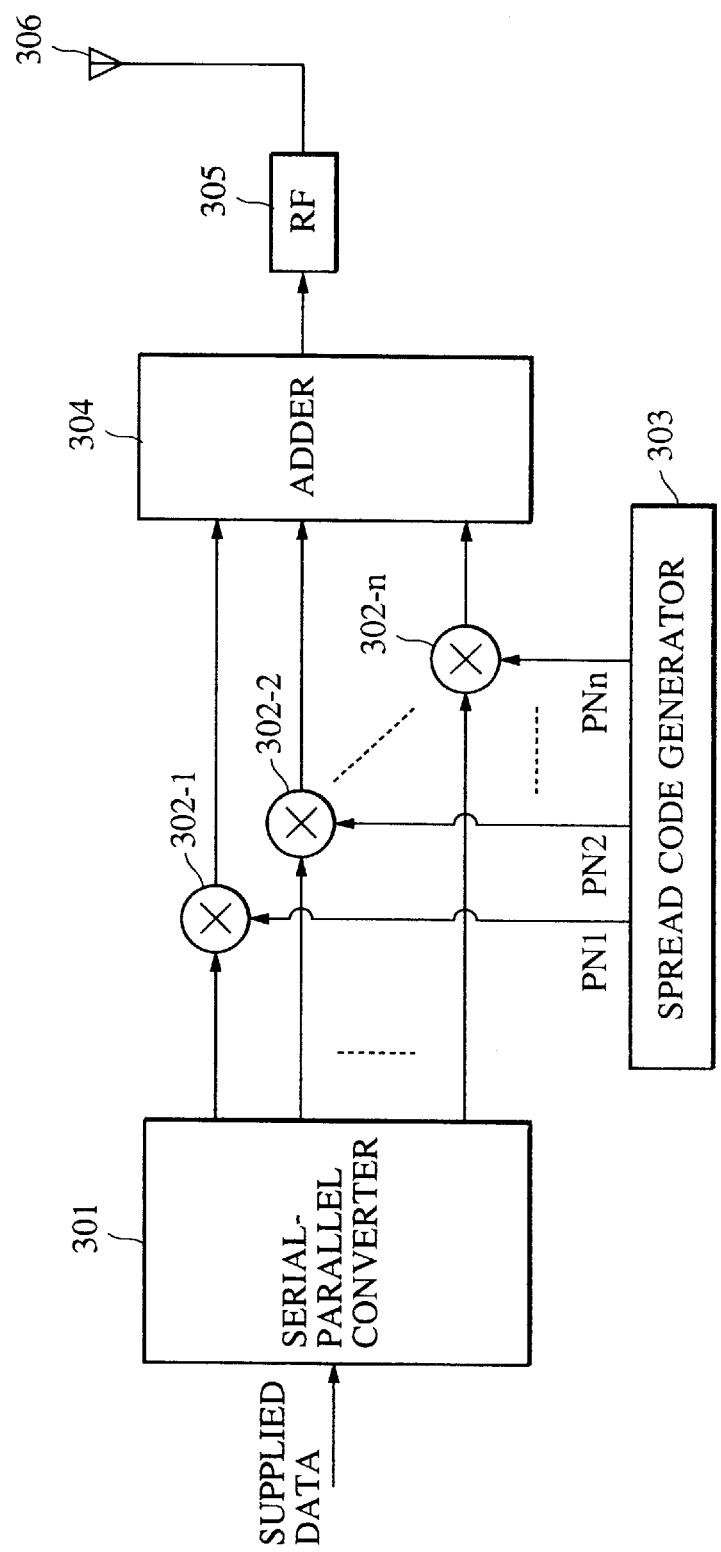
FIG. 31 is a diagram showing the structure of a transmission system of the related art.
Figure 32:
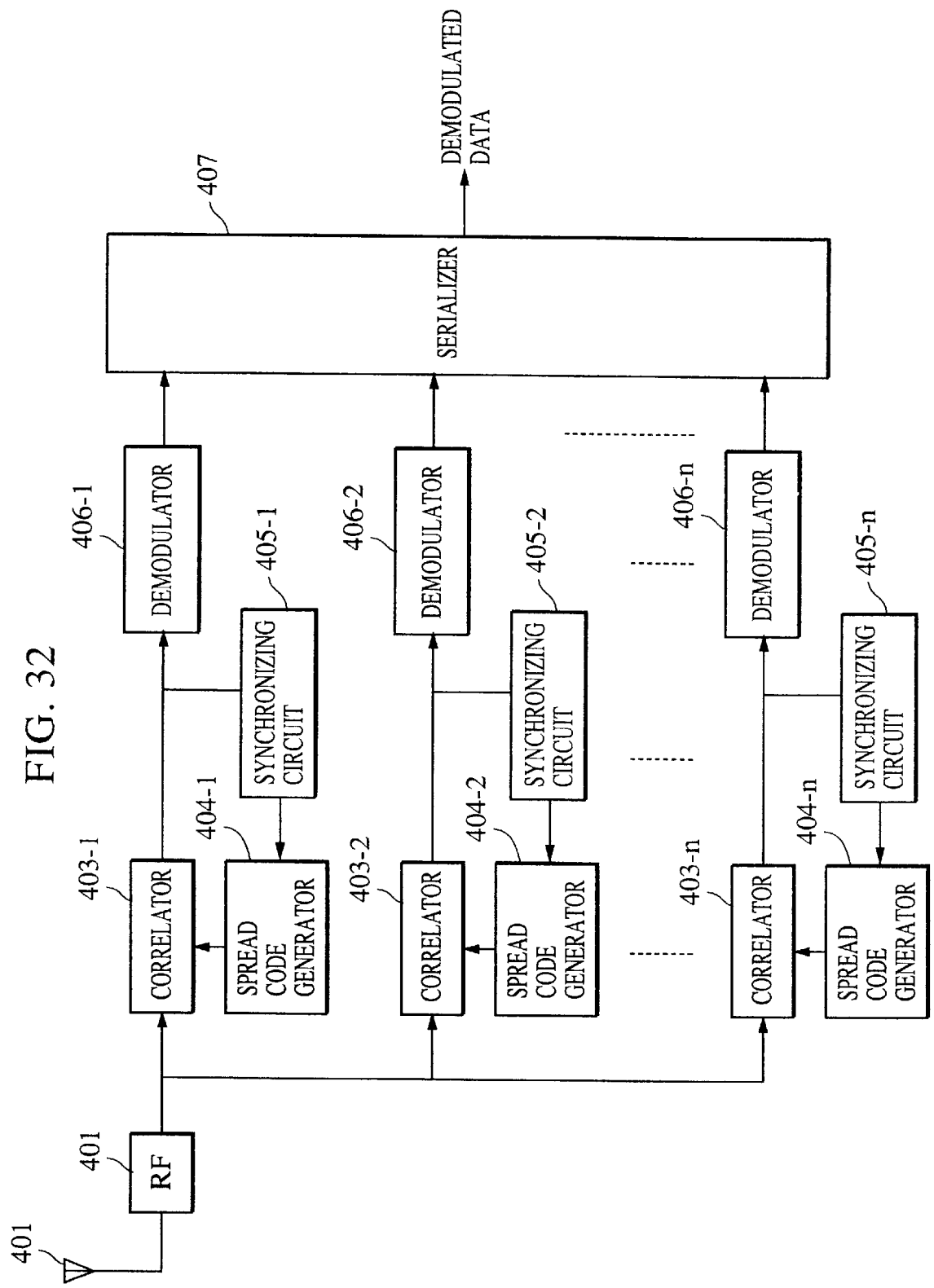
FIG. 32 is a diagram showing the structure of a transmission system of the related art.

Although the foregoing embodiments have a structure in which the communication is performed between the transmission side and the receiving side by a wireless signal (high frequency signal), a base-band signal may be used to perform the communication, as shown in FIG. 30.

Referring to FIG. 30, the structure of the synchronizing circuit/code generator 4, the demodulator 7, and the serializer 6 is the same as those according to the third embodiment shown in FIG. 17.

Although the invention has been described in its preferred form with a certain degree of particularity, it is understood that the present disclosure of the preferred form can be changed in the details of construction and the combination and arrangement of parts may be changed without departing from the spirit and the scope of the invention as hereinafter claimed.

What is claimed is:

1. A receiving apparatus for receiving a multi-code spread spectrum signal, said receiving apparatus comprising:

conversion means for converting a received signal into a base-band signal;

detection means for detecting a spread code included in the received signal; and demodulation means for demodulating the received signal in accordance with a plurality of spread codes in synchronization with a detection performed by said detection means, wherein said detection means detects the spread code from the base-band signal; and said demodulating means demodulates the base-band signal in accordance with the plurality of spread codes.

2. A receiving apparatus according to claim 1, wherein said conversion means includes a local oscillator.

3. A receiving apparatus according to claim 1, wherein said conversion means converts the received signal into two base-band signals having different phases.

4. A receiving apparatus according to claim 1, wherein said demodulation means comprises:

analog/digital conversion means for analog/digital converting the base-band signal;

calculation means for calculating an output from said analog/digital conversion means and the plurality of spread codes;

integrating means for integrating the output from said calculation means for one period of the spread code; and discrimination means for discriminating the received signal in accordance with an output from said integrating means.

5. A receiving apparatus according to claim 1, wherein said detection means detects the spread code in response to a first clock, and said demodulation means performs demodulation in response to a second clock, the frequency of which is lower than that of the first clock.

6. A receiving apparatus according to claim 1, wherein said conversion means includes an analog/digital conversion means for analog/digital converting the base-band signal, and said demodulation means includes means for thinning an output from said analog/digital conversion means.

7. A receiving apparatus according to claim 1, wherein said detection means comprises:

sampling means for sampling the base-band signal;

correlation means for causing an output from said sampling means and the spread code to correlate with each other;

delay means for delaying an output from said correlation means; and supply means for supplying a sampling clock to said sampling means in accordance with the difference between an output from said correlation means and an output from said delay means.

8. A receiving apparatus according to claim 1, wherein said detection means comprises:

sampling means for sampling the base-band signal;

correlation means for causing an output from said sampling means and the spread code to correlate with each other;

shift detection means for detecting a shift in sampling of a peak of correlation in accordance with an output from said correlation means; and supply means for supplying a sampling clock to said sampling means in accordance with the shift detected by said shift detection means.

9. A receiving apparatus according to claim 1, wherein said conversion means includes reproducing means for reproducing a carrier of the received signal.

10. A receiving apparatus according to claim 1, wherein said conversion means includes a costas loop.

11. A receiving apparatus according to claim 3, wherein said demodulation means demodulates each of the two base-band signals to demodulate a signal that has been orthogonally modulated.

12. A receiving apparatus for receiving a multi-code spread spectrum signal, said receiving apparatus comprising:

conversion means for converting a received signal into two base-band signals having different phases;

detection means for detecting a spread code included in the received signal; and discrimination means for discriminating received data items, the number of which is the same as that of a plurality of spread codes, on the basis of the plurality of spread codes and the two base band signals in synchronization with a detection performed by said detection means.

13. A receiving apparatus for receiving a multi-code spread spectrum signal, said receiving apparatus comprising:

conversion means for converting a received signal into a base-band signal;

detection means for detecting a spread code included in the received signal; and despreading means for despreading the base-band signal on the basis of a plurality of spread codes in synchronization with a detection performed by said detection means, wherein said conversion means converts the received signal into the base-band signal before the base-band signal is despread.

14. A receiving apparatus according to claim 13, wherein said conversion means converts the received signal into two base-band signals having different phases, and said despreading means despreads, in response to the two base-band signals.

15. A communication apparatus for communicating a spread spectrum signal, the code of which has been divided and multiplexed, said communication apparatus comprising:

first communication means for communicating spread communication data with a plurality of spread codes; and second communication means for communicating a synchronizing code having a DC component that is not zero.

16. A communication apparatus according to claim 15, wherein said second communication means includes reproducing means for reproducing a carrier in accordance with the synchronizing code having the DC component, and said first communication means includes conversion means for converting the received signal into a base-band signal in accordance with the carrier reproduced by said reproducing means.

17. A receiving apparatus for receiving, from a transmitter, a multi-code spread base-band signal, said receiving apparatus comprising:

receiving means for receiving a base-band signal from the transmitter;

detection means for detecting a spread code included in the received base-band signal; and demodulation means for demodulating the received base-band signal on the basis of a plurality of spread codes in synchronization with a detection performed by said detection means.

18. A method of receiving a multi-code spread spectrum signal, said method comprising the steps of:

converting a received signal into a base-band signal;

detecting a spread code included in the received signal; and demodulating the received signal on the basis of a plurality of spread codes in synchronization with a detection performed in said detecting step, wherein the spread code is detected from the base-band signal, and the received signal which is converted into said base-band signal being demodulated in accordance with the plurality of spread codes.

19. A receiving apparatus for receiving a multi-code spread spectrum signal, the code of which has been divided and multiplexed, said receiving apparatus comprising:

first receiving means for receiving the multi-code spread spectrum signal with a plurality of spread codes; and second receiving means for receiving a synchronizing code having a DC component that is not zero.

20. A receiving apparatus according to claim 19, wherein said second receiving means includes reproducing means for reproducing a carrier in accordance with the synchronizing code having the DC component, and wherein said first receiving means includes conversion means for converting the multi-code spread spectrum signal into a base band signal in accordance with the carrier reproduced by said reproducing means.

21. A receiving method for receiving a multi-code spread spectrum signal, said method comprising the steps of:

converting a received signal into a base-band signal;

detecting a spread code included in the base-band signal; and demodulating the base-band signal in accordance with a plurality of spread codes in synchronization with a detection performed by said detection step.

22. A method according to claim 21, wherein said conversion step converts the received signal into two base-band signals having different phases.

23. A method according to claim 21, wherein said detection step detects the spread code in response to a first clock, and said demodulation step performs demodulation in response to a second clock, the frequency of which is lower than that of the first clock.

24. A method according to claim 21, wherein said conversion step includes an analog/digital conversion step of analog/digital converting the base-band signal into a digital signal, and said demodulation step includes a step of thinning the digital signal.

* * * * *

UNITED STATES PATENT AND TRADEMARK OFFICE
CERTIFICATE OF CORRECTION

PATENT NO. : 5,856,997

DATED : January 5, 1999

INVENTOR(S) : NORIHIRO MOCHIZUKI ET AL.

Page 1 of 2

It is certified that error appears in the above-identified patent and that said Letters Patent is hereby corrected as shown below:

COLUMN 7

Line 31, "numeral" should read --numerals--.

COLUMN 10

Line 7, "(bit)-1" should read --(bit)-1--.

COLUMN 19

Line 29, "base band" should read --base-band--.

UNITED STATES PATENT AND TRADEMARK OFFICE
CERTIFICATE OF CORRECTION

PATENT NO. : 5,856,997

DATED : January 5, 1999

INVENTOR(S) : NORIHIRO MOCHIZUKI ET AL.

It is certified that error appears in the above-identified patent and that said Letters Patent is hereby corrected as shown below:

<u>COLUMN 20</u>

Line 41, "base band" should read --base-band--.

Signed and Sealed this

Sixteenth Day of November, 1999

Attest:

Q. TODD DICKINSON

*Attesting Officer*   Acting Commissioner of Patents and Trademarks